US011879287B2

(12) United States Patent
Sellinger et al.

(10) Patent No.: US 11,879,287 B2
(45) Date of Patent: Jan. 23, 2024

(54) DOOR CLOSING DEVICE

(71) Applicant: MASONITE CORPORATION, Tampa, FL (US)

(72) Inventors: Joel Sellinger, Blaine, WA (US); Benjamin W. Docksteader, Custer, WA (US)

(73) Assignee: MASONITE CORPORATION, Tampa, FL (US)

(*) Notice: Subject to any disclaimer, the term of this patent is extended or adjusted under 35 U.S.C. 154(b) by 0 days.

(21) Appl. No.: 18/124,066

(22) Filed: Mar. 21, 2023

(65) Prior Publication Data

US 2023/0220721 A1 Jul. 13, 2023

Related U.S. Application Data

(63) Continuation of application No. 16/608,774, filed as application No. PCT/US2018/029443 on Apr. 25, (Continued)

(51) Int. Cl.
*E05F 15/00* (2015.01)
*E05F 15/72* (2015.01)
(Continued)

(52) U.S. Cl.
CPC ................ *E05F 15/72* (2015.01); *E05F 1/12* (2013.01); *G08B 3/10* (2013.01); *E05Y 2201/41* (2013.01);
(Continued)

(58) Field of Classification Search
CPC ... E05F 15/72; E05F 1/12; G08B 3/10; E05Y 2201/41; E05Y 2201/434; E05Y 2201/462;
(Continued)

(56) References Cited

U.S. PATENT DOCUMENTS 5,878,530 A 3/1999 Eccleston et al.
6,481,160 B1 11/2002 Kowalczyk
(Continued)

FOREIGN PATENT DOCUMENTS

CN 109629954 A 4/2019
DE 2702996 A1 8/1977
(Continued)

OTHER PUBLICATIONS

European Search Report dated Nov. 20, 2020 Received in Related EP Application No. 18791855.2.

*Primary Examiner* — Jerry E Redman
(74) *Attorney, Agent, or Firm* — CANTOR COLBURN LLP

(57) ABSTRACT

An apparatus comprises a base plate configured to be coupled to a door, the door configured to be positioned in an open position and a closed position; a closing mechanism coupled to the base plate and configured to be coupled to a hinge of the door and having an unprimed state and a primed state, the closing mechanism configured to be transitioned between the unprimed state and the primed state by a user; wherein in the unprimed state the closing mechanism is decoupled from operation of the door; and in the primed state the closing mechanism is configured to move the door into the closed position responsive to receipt of a signal, and the closing mechanism is configured to allow movement of the door between the open position and the closed position in absence of the signal.

18 Claims, 23 Drawing Sheets

Related U.S. Application Data 2018, now Pat. No. 11,608,670, which is a continuation of application No. 15/867,628, filed on Jan. 10, 2018, now Pat. No. 10,808,447.

(60) Provisional application No. 62/645,515, filed on Mar. 20, 2018, provisional application No. 62/632,790, filed on Feb. 20, 2018, provisional application No. 62/625,449, filed on Feb. 2, 2018, provisional application No. 62/525,717, filed on Jun. 27, 2017, provisional application No. 62/489,641, filed on Apr. 25, 2017.

(51) Int. Cl.

*E05F 1/12* (2006.01)
*G08B 3/10* (2006.01)

(52) U.S. Cl.

CPC ... *E05Y 2201/434* (2013.01); *E05Y 2201/462* (2013.01); *E05Y 2201/474* (2013.01); *E05Y 2201/484* (2013.01); *E05Y 2201/618* (2013.01); *E05Y 2201/638* (2013.01); *E05Y 2201/654* (2013.01); *E05Y 2201/668* (2013.01); *E05Y 2201/722* (2013.01); *E05Y 2400/40* (2013.01); *E05Y 2400/52* (2013.01); *E05Y 2400/612* (2013.01); *E05Y 2400/66* (2013.01); *E05Y 2600/46* (2013.01); *E05Y 2800/252* (2013.01); *E05Y 2900/132* (2013.01); *E05Y 2900/134* (2013.01)

(58) Field of Classification Search

CPC ......... E05Y 2201/474; E05Y 2201/484; E05Y 2201/618; E05Y 2201/638; E05Y 2201/654; E05Y 2201/668; E05Y 2201/722; E05Y 2400/612; E05Y 2400/66; E05Y 2600/46; E05Y 2900/132; E05Y 2900/134

USPC .............................................................. 49/31

See application file for complete search history.

(56) References Cited

U.S. PATENT DOCUMENTS

| | | | | |
|---|---|---|---|---|
| 6,891,479 | B1 * | 5/2005 | Eccleston | E05F 15/63 340/545.1 |
| 7,367,161 | B1 | 5/2008 | Jones | |
| 8,169,169 | B2 | 5/2012 | Hass | |
| 9,574,389 | B2 * | 2/2017 | Menze | E05B 1/0053 |
| 10,626,651 | B2 | 4/2020 | Chang | |
| 10,808,447 | B2 * | 10/2020 | Docksteader | E05F 1/12 |
| 11,072,964 | B2 | 7/2021 | Teta | |
| 11,428,039 | B2 * | 8/2022 | Docksteader | G08B 3/10 |
| 11,434,682 | B2 | 9/2022 | Sellinger | |
| 11,608,670 | B2 | 3/2023 | Sellinger | |
| 11,697,958 | B1 * | 7/2023 | Weinerman | H04W 4/12 49/28 |
| 2005/0091928 | A1 * | 5/2005 | Okulov | E05F 15/74 49/341 |
| 2010/0065705 | A1 | 3/2010 | Brown et al. | |
| 2010/0115853 | A1 | 5/2010 | Gebhart et al. | |
| 2010/0242368 | A1 | 9/2010 | Yulkowski | |
| 2011/0252597 | A1 | 10/2011 | Burris et al. | |
| 2014/0196372 | A1 | 7/2014 | Boren | |
| 2015/0059249 | A1 | 3/2015 | Yulkowski | |
| 2016/0237732 | A1 | 8/2016 | Kerley | |
| 2018/0305969 | A1 * | 10/2018 | Docksteader | E05F 15/72 |
| 2019/0376332 | A1 | 12/2019 | Chi-Hsueh | |
| 2019/0390503 | A1 * | 12/2019 | Teta | E05F 1/1207 |
| 2020/0131824 | A1 | 4/2020 | Opgenorth | |
| 2020/0177051 | A1 | 6/2020 | Abe | |
| 2020/0190885 | A1 * | 6/2020 | Coleman | E05F 3/222 |
| 2022/0136305 | A1 * | 5/2022 | Elwine | E05B 41/00 49/334 |
| 2022/0403692 | A1 | 12/2022 | Docksteader | |

FOREIGN PATENT DOCUMENTS

| | | | | |
|---|---|---|---|---|
| DE | 19964251 | A1 | 4/2003 | |
| DE | 102018008812 | A1 | 5/2020 | |
| EP | 1944446 | A2 | 7/2008 | |
| GB | 1362194 | A | 7/1974 | |
| KR | 2018029373 | A * | 3/2018 | E05F 1/006 |
| WO | 2019191606 | A1 | 10/2019 | |
| WO | 2021089802 | A1 | 5/2020 | |

* cited by examiner

DOOR CLOSING DEVICE

CROSS-REFERENCE TO RELATED APPLICATION

The present application is a continuation of U.S. patent application Ser. No. 16/608,774 filed Oct. 25, 2019, now U.S. Pat. No. 11,608,670, which is a national stage of PCT/US2018/029443, filed Apr. 25, 2018, which claims priority to U.S. patent application Ser. No. 15/867,628, now U.S. Pat. No. 10,808,447, filed Jan. 10, 2018, which claims priority to U.S. Provisional Application No. 62/489,641 filed Apr. 25, 2017, and U.S. Provisional Application No. 62/525,717 filed Jun. 27, 2017. The present application also claims priority to U.S. Provisional Application No. 62/625,449 filed Feb. 2, 2018; U.S. Provisional Application No. 62/632,790 filed Feb. 20, 2018; and U.S. Provisional Application No. 62/645,515 filed Mar. 20, 2018. All applications in this paragraph are incorporated herein by reference, in their entirety, for any purpose.

FIELD

The disclosure relates generally to door closing device. Examples are described of devices that may facilitate closure of a door responsive to a condition, such as smoke or fire.

BACKGROUND

For some people, physically closing interior doors in the home all the time or even every night may not be appealing or may be burdensome. In regards to fire safety, a closed door may greatly reduce the spread of fire and smoke. This can save lives, limit damage, and in some cases even help suppress the fire. In other situations, such as a non-emergency event, it may be desirable for a door closing device to be remotely operated to close a door in response to a signal. There exists a need for an apparatus, system, and methods that closes a door when triggered by an input, for example, a built-in smoke detector, an audio trigger from a smoke detectors, a wireless signal from a home protection system, or a manual button by a user.

BRIEF SUMMARY

In some examples, an apparatus may include a base plate configured to be coupled to a door, the door configured to be positioned in an open position and a closed position; a closing mechanism coupled to the base plate and configured to be coupled to a hinge of the door and having an unprimed state and a primed state, the closing mechanism configured to be transitioned between the unprimed state and the primed state by a user; wherein in the unprimed state the closing mechanism is decoupled from operation of the door; and in the primed state the closing mechanism is configured to move the door into the closed position responsive to receipt of a signal, and the closing mechanism is configured to allow movement of the door between the open position and the closed position in absence of the signal.

In some examples, the transition between the unprimed state and primed state may provide a feedback to the user. In some examples, the closing mechanism may include a motor or solenoid.

In some examples, the closing mechanism may include a hinge pivot cam configured to be coupled to the hinge of the door using a hinge pin and coupled to the base plate using a tension member. The closing mechanism may be configured to move the door into the closed position at least in part by exerting a stored energy within the closing mechanism onto the tension member.

In some examples, the apparatus may be configured to be positioned adjacent a door. The apparatus may be configured to be positioned at least partially within the door. In some examples, the closing mechanism may include a biasing member pivotally coupled with a pawl member and a gear member. The closing mechanism may include a biasing member slidably coupled with a pawl member and a gear member.

In some examples, the closing mechanism may be positioned within the hinge of the door. In some examples, the closing mechanism may be configured to receive the signal from at least one of the following: a smoke detector, a temperature detector, a carbon monoxide detector, a home alarm system, a mobile device, or a smarthome hub. In some examples, the closing mechanism may include a receiver configured to receive the signal and a processor configured to trigger the closing mechanism to move the door into the closed position.

In some examples, an apparatus may include a base plate configured to be coupled to a door, the door configured to be positioned in an open position and a closed position; a closing mechanism coupled to the base plate and configured to be coupled to a frame of the door and having an unprimed state and a primed state, wherein in the unprimed state the closing mechanism is decoupled from operation of the door; and in the primed state the closing mechanism is configured to move the door into the closed position responsive to receipt of a signal, and the closing mechanism is configured to allow movement of the door between the open position and the closed position in absence of the signal.

In some examples, the closing mechanism may include a gear motor coupled with a tension member. The tension member may be coupled to the frame of the door. In some examples, the gear motor may be biasedly coupled to the base plate.

In some examples, the closing mechanism may be configured to receive the signal from at least one of the following: a smoke detector, a temperature detector, a carbon monoxide detector, a home alarm system, a mobile device, or a smarthome hub. The closing mechanism may include a receiver configured to receive the signal and a processor configured to trigger the closing mechanism to move the door into the closed position.

In some examples, an apparatus may include an upper face opposite a lower face, the lower face configured to be positioned adjacent a door hinge; a cam body positioned between the upper face and the lower face and including a hinge aperture extending between the upper face and lower face and configured to receive a portion of a hinge pin; a cam lobe extending away from the cam body; a tang extending away from the cam body and configured to be positioned adjacent a door to resist rotation of the apparatus independent of the door hinge, wherein the tang has a height that is larger than a height of the cam body and cam lobe and a width similar to that of a hinge plate of the door hinge; a tension member aperture extending through the cam body and configured to allow a tension member to extend through the apparatus, wherein the tension member aperture is normal to the hinge aperture; and a tension member countersink that extends into the cam body and is configured to seat an end of a tension member.

This Summary is provided to introduce a selection of concepts in a simplified form that are further described below in the Detailed Description. This Summary is not intended to identify key features or essential features of the claimed subject matter, nor is it to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

BRIEF DESCRIPTION OF THE DRAWINGS

The images which accompany the written portion of this specification illustrate examples and methods of use for the present disclosure according to the teachings of the present disclosure.

The various embodiments of the present disclosure will hereinafter be described in conjunction with the appended drawings.

DETAILED DESCRIPTION

Various examples of a system for closing a door in response to a remote signal are disclosed herein. In accordance with examples herein, a system for closing a door in response to a receipt of a signal may include an apparatus coupled to a door having the capability to move or alter a position of the door, and a control system that may be used to receive a remote signal to move or alter the position of the door and send a signal to the apparatus to move or alter the position or the door. In some examples, the apparatus and control system are electrically connected.

Figure 1:
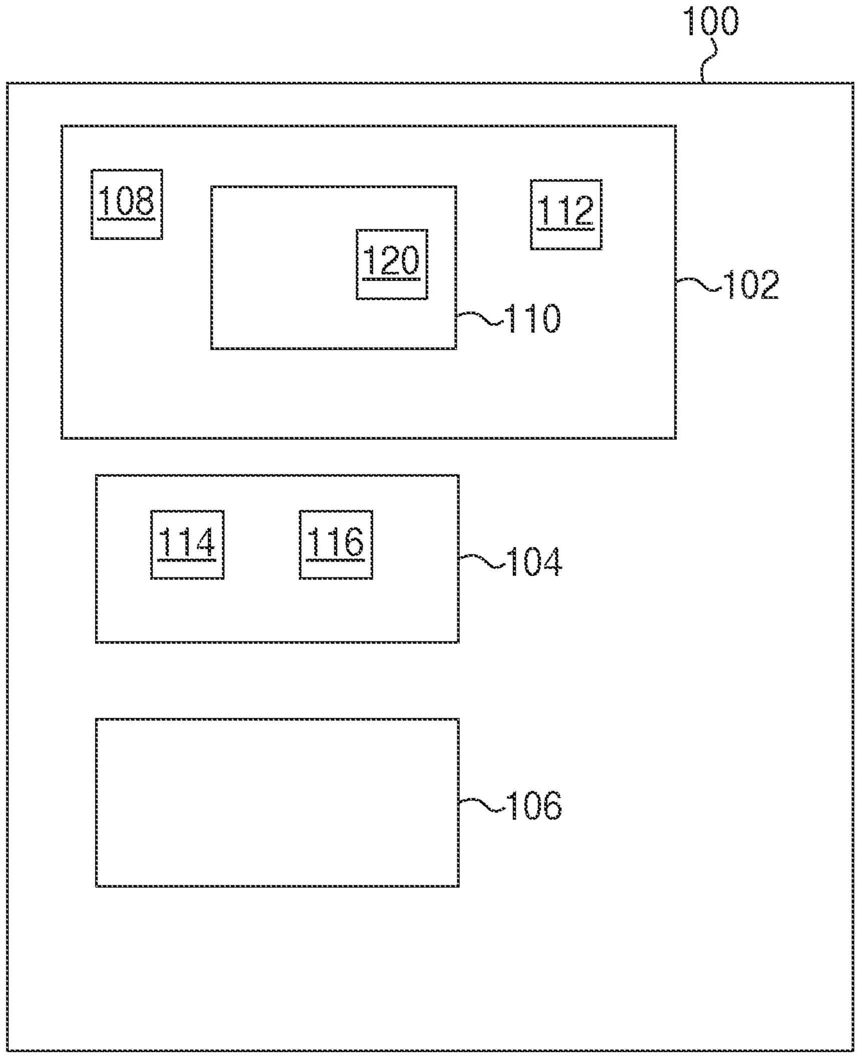
FIG. 1 is a system in accordance with an embodiment of a door closing device.

FIG. 1 illustrates a system in accordance with one embodiment of a door closing device.

In accordance with examples herein, the system 100 for closing a door in response to a receipt of a signal may include an apparatus 102 coupled to a door having the capability to move or alter a position of the door, and a control system 104 that may be used to receive a remote signal to move or alter the position of the door and send or communicate a signal to the apparatus to move or alter the position or the door. In some examples, the apparatus 102 and control system 104 are electrically connected.

In some examples, the system 100 may include a communication system 106 that may be used communicate various information with and about the apparatus 102 and control system 104. In some examples, this communicated information may include a status of the apparatus 102, a positional status of the door such as if the door is in an open position or a closed position, a status of the control system 104, communicate a signal to the control system 104, receive a communication or a signal from the control system 104, etc.

In some examples, the apparatus 102 of the system 100 may include a door mount 108, a closing mechanism 110 with a movement generator 122, an unprimed state 118, and a primed state 120, and a power supply 112. In some examples, the closing mechanism 110 may be used to move or alter a position of the door, such as to move the door from an open position into closed position. In some examples, the power supply 112 may be used to provide electrical power to the closing mechanism 110. In some examples, the power supply 112 may supply power to the control system 104 and/or the communications system 106. In some examples, the door mount 108 may be used to help secure the closing mechanism 110 to the door. In some examples, at least a portion of the closing mechanism 110 may be secured or coupled directly or indirectly to a door hinge or door frame of the door.

In some examples, the closing mechanism 110 may include a primed state 120 and an unprimed state 118. In the unprimed state 118, the closing mechanism 110 may be decoupled from operation of the door. In some examples, in the primed state, energy may be stored within the closing mechanism 110 and released responsive to a signal received by the apparatus 102. In some examples, in the primed state, the movement generator 122 of the closing mechanism 110 may move responsive to a signal received by the apparatus 102, and the door may be moved into the closed position. In some examples, in the primed state 120, the closing mechanism 110 may allow movement of the door between the open position and the closed position in absence of the signal.

Various examples and forms of closing mechanisms 110 may be used. In some examples, the closing mechanism 110 may be positioned adjacent a surface of the door and the door mount 108 may couple the closing mechanism 110 to the surface of the door. In some examples, the closing mechanism 110 may be positioned at least partially within the door. In some examples, a portion of the closing mechanism 110 may be coupled to the door hinge, door frame, door jamb, or other object.

In some examples, the closing mechanism 110 may include a movement generator 122 and a hinge pivot cam. In some examples, the closing mechanism may include the movement generator 122 and a ratchet assembly. In some examples, the closing mechanism 110 may include the movement generator 122 and a tension member. In some examples, a hinge pivot cam may be coupled to the hinge of the door using a hinge pin. In some examples, the ratchet assembly may be positioned at least partially within the hinge of the door. In some examples, the ratchet assembly may be coupled to the hinge of the door. In some examples, the movement generator 122 may be coupled to the ratchet assembly that may be coupled to the tension member that may be coupled to the door hinge, door frame, or door jamb. In some examples, the tension member may couple the hinge pivot cam with the ratchet assembly or the movement generator 122. In some examples, the closing mechanism 110 may use a spring, biasing element, or other energy storage device. In some examples, the spring may be a torsion spring, extension spring, compression spring, leaf spring, or other type of spring. For simplicity, the term spring as used throughout this specification may include any variety of these.

A variety of examples of ratchet assemblies may be used. In some examples, the ratchet assembly may be used to move or transition the closing mechanism 110 between the unprimed state 118 to the primed state 120. In some examples, the ratchet assembly may be a device that allows linear or rotary motion in only one direction, while preventing motion in the opposite direction. The ratchet assembly may include a ratchet, sprocket, gear, gear wheel, or linear rack with teeth, and pawl that engages with an individual tooth or between two individual teeth of the ratchet, sprocket, gear, gear wheel, or linear rack. In some examples, the ratchet may be spring loaded or coupled with an energy storage device so that the ratcheting movement of the ratchet may store energy within the spring. In some examples, the pawl may be spring loaded or coupled with an energy storage device so that the movement of the pawl may store energy within the spring.

In some examples, the ratchet assembly includes a ratchet with multiple teeth and a pawl. In some examples, the pawl may be coupled to the movement generator 122 which may move in response to the signal sent to the apparatus 102. In some examples, the ratchet is biased with an energy storage member, such as a spring, so that it stores little to no energy when in the unprimed state, but stores energy in the primed state. In some examples, the pawl may be biased to engage with a tooth or between teeth of the ratchet. In the primed state, a biasing force on the pawl may be greater than a biasing force exerted on the ratchet. In some examples, the pawl may hold the ratchet and help to prevent or resist the release of stored energy from the ratchet.

In some examples, in the unprimed state, the door may be positioned in the closed position and the ratchet may be positioned in resting position, where little to no energy is stored in the ratchet. In some examples, in the primed state, the door may be in the closed, partially open or closed, or open positions, and energy is stored in the ratchet.

In use, in the unprimed state, the ratchet is positioned in the resting position with little to no energy stored within it, and the pawl may biasedly engaged with a first tooth or between two teeth of the ratchet. As a user moves and rotates the door from the closed position to the open position, the rotational force the user imparts into the door is transmitted into the ratchet and overcomes the biasing forces on both the ratchet and the pawl, and causes the ratchet to move. In some examples the ratchet moves in a rotational motion, linear motion, or a combinations thereof.

As the ratchet is moved, energy is stored within the ratchet, such as in a coupled or attached spring. As the ratchet moves, the pawl remains biased again the ratchet and may follow along a profile of the teeth of the ratchet, thereby disengaging with the first tooth of the ratchet and engaging or meshing with sequential or adjacent ratchet teeth. As the door is opened, the energy is transferred and stored into the ratchet, and the pawl continues to engage incremental teeth on the ratchet. The biased pawl may prevent the ratchet from releasing the stored energy and returning or moving back to ratchet's resting position. The pawl may therefore help store the energy in the ratchet assembly. When energy is stored in the ratchet and the pawl prevents the ratchet from releasing the energy, the closing mechanism may be in the primed state.

Upon receipt of a signal from the control system 104, the communications system 106, or combinations thereof, the movement generator 122 may move the pawl so that it disengages from the ratchet. In some examples, the movement generator 122 is a solenoid, a motor, or another apparatus that may generate a rotational or translational movement in response to a signal. As the pawl is disengaged, the energy stored in the ratchet, such as the biasing force on the ratchet, is released and so that the ratchet moves back into its resting position. If the door is in the open position, the ratchet's energy release may move the ratchet and therefore move the door from the open position to the closed position. If the door is in the closed position, the ratchet's energy release may move the ratchet but may not move the door.

Figure 2:
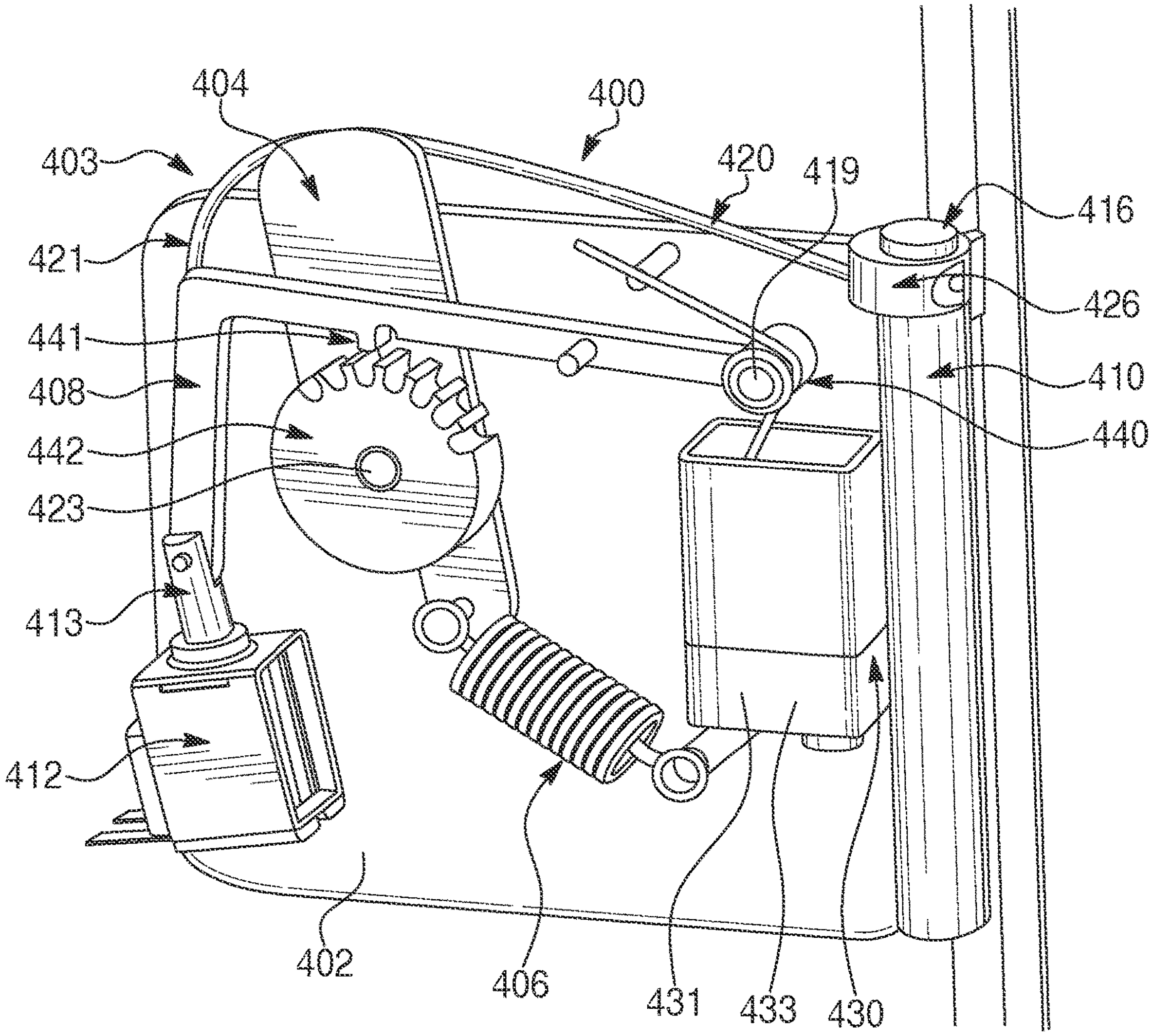
FIG. 2 is a perspective view of an example apparatus in accordance with the present disclosure.
Figure 3:
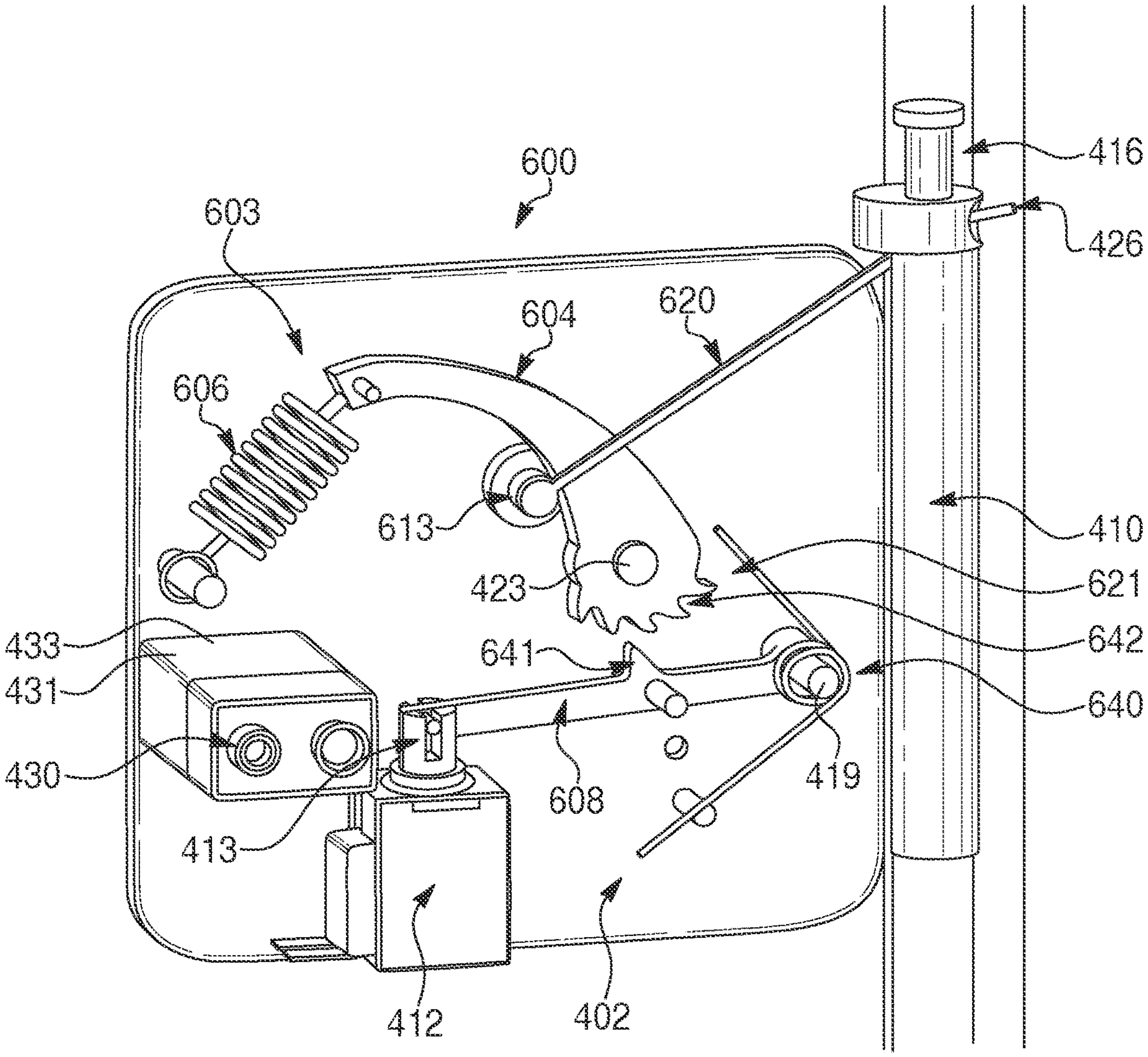
FIG. 3 is a perspective view of an example apparatus in accordance with the present disclosure.

Examples of a closing mechanism 110 and associated components that may include a ratchet assembly are shown, at a minimum, in FIGS. 2-4 *b*, 7-8, 11-13, 16, and 17. Examples of a closing mechanism 110 that may include a pivot member that couples with the ratchet assembly, are shown, at a minimum, in FIGS. 2-4 *b*, and 7-8. Examples of closing mechanism 110 that may include a linearly moveable sled that couples with the ratchet assembly, are shown, at a minimum in FIGS. 11-13, and 16-17. Other figures may include various details or variations of a closing mechanism 110 that includes a ratchet assembly.

A variety of spool assemblies may be used. In some examples, the closing mechanism 110 may include the movement generator 122 coupled to a spool assembly coupled to the door frame, door jamb, or other stationary structure. In some examples, the spool assembly may be coupled to a tension member. In some examples, the movement generator 122 of the closing assembly 110 may be a motor. When in the primed state 120, upon receipt of a signal, the motor may be engaged to rotate and wrap the tension member about the spool assembly. The rotation of the tension member about the spool assembly may shorten the effective length of the tension member between the motor and the door frame, door jamb, or other stationary structure. The shortening of the effective length may result in moving or pulling the door from the open position to the closed position.

In examples where the closing mechanism 110 includes the spool assembly, the movement generator may 122 may also include a safety mechanism to allow the closing mechanism 110 to be manually overridden when the tension member is being wrapped about the spool assembly to move the door to the closed position. The safety mechanism may allow the door to be manually moved by a user from the closed position to the open position. In some examples, the safety mechanism includes a safety biasing member to biasingly couple the motor to a door mount, such as a base plate. In use, the safety mechanism may allow the position of the motor to move, such as by linearly sliding or rotating. When in use, energy may be stored in the safety mechanism when the door is opened, and the energy is released when the user releases the door and the closing mechanism 110 moves the door back into the closed position.

Figure 19:
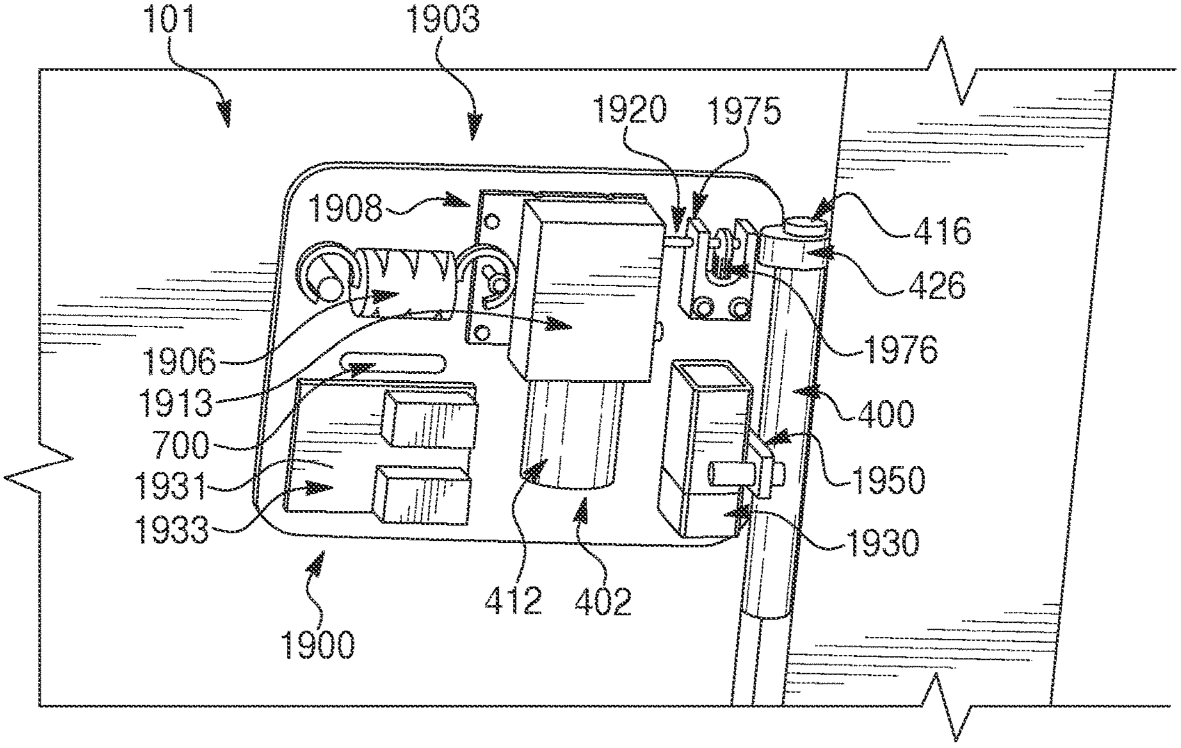
FIG. 19 is a perspective view of an example apparatus in accordance with the present disclosure.
Figure 20:
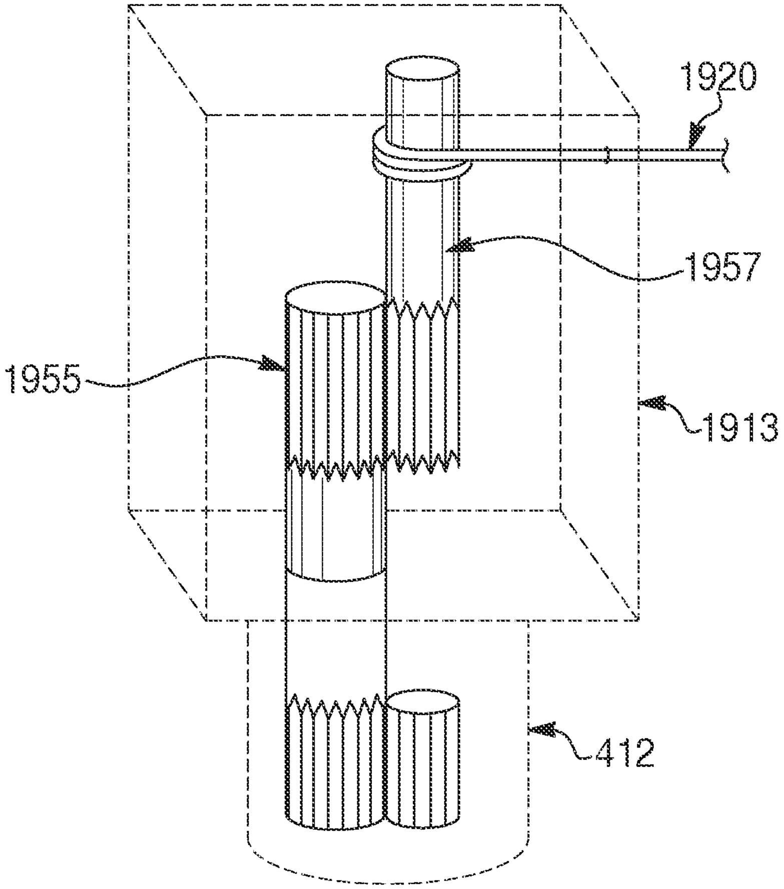
FIG. 20 is a perspective view of a gear reduction assembly.

Examples of a closing mechanism coupled to a spool assembly may be shown, at a minimum in FIGS. 19-20. An example of the closing mechanism 110 coupled to the spool assembly that may include a tension member that extends through a hinge and is coupled to the door frame or doorjamb, is shown, at a minimum, in FIG. 14. Other figures may include various details or variations of a closing mechanism 110 that includes a spool assembly.

Details of various examples of systems for closing a door in response to a signal will now be described.

FIG. 2 is a perspective view of an example apparatus in accordance with the present disclosure. FIG. 2 shows an apparatus 400 with a closing mechanism 403, a tension member 420, a base plate 402, a closing cam 404, a spring 406, a coupling member 408, a hinge assembly 410, a movement generator 412, a moveable plunger member 413, a hinge pin 416, a tension member 420, a ratchet assembly 421, a hinge pivot cam 426, a power supply 430, a spring 440, a pawl 441, and a gear 442.

In some examples, the closing mechanism 403 may be similar to the closing mechanism 110 as described with reference to FIG. 1. In some examples, the apparatus 400 may include a door mount in the form of a base plate 402 in which various components or members of the closing mechanism 403 may be coupled to, connected with, or attached to, and allows to the apparatus to be coupled to a door.

In some examples, the closing mechanism 403 includes a movement generator 412 coupled to the base plate 402. In some examples, the movement generator 412 may be a motor. In some examples, the movement generator 412 may be solenoid. In some examples, the movement generator 412 may be coupled to and controls a position or alignment of a moveable plunger member 413.

In some examples, a first end of the moveable plunger member 413 is coupled to a coupling member 408, such that the movement of the moveable plunger member 413 may move or change a position or alignment of the closing member 408. A second end of the coupling member 408 may be coupled or connected to a spring 440.

In some examples, the second end of the coupling member 408 is pivotally coupled to the base plate 402 at a pin 419. In some examples, the spring 440 may bias or help control a position of the coupling member 408.

As shown in FIG. 2, in some examples, closing mechanism 403 includes a ratchet assembly 421, which may include a pawl 441 and a gear 442. In some examples, the pawl 441 extends from the coupling member 408. In some examples, the gear 442 may be mounted to or coupled with the closing cam 404. In some examples, the gear 442 may have a round perimeter forming an outside diameter and a flat face, with teeth formed on at least a portion of the outside diameter. In other examples, the gear may have an oblong or different shape with teeth formed on an edge or perimeter. The closing cam 404 and gear 442 may be pivotally mounted, slidably mounted, or combinations thereof to the base plate 402 at a pin 423. In some examples, the closing cam 404 may have a rectangular shape, with a first end having a groove for the tension member 420 to slide within, on top of, or about, and a second end coupled to a spring 406. In some examples, the spring 406 is a spring or other energy storage device. In some examples, a first end of the spring 406 is coupled to the closing cam 404, and a second end is coupled to the base plate 402.

In some examples, the closing mechanism 403 includes a hinge pivot cam 426. The hinge pivot cam 426 may be coupled to an existing hinge assembly 410 via a hinge pin 416. In some examples, the hinge pivot cam 426 is also coupled to an end of the tension member 420, with another end of the tension member 420 being coupled to components of the closing mechanism 403 and/or the base plate 402. In use, the hinge pivot cam 426 may not rotate or move when the door is moved between open and closed positions. The hinge pivot cam 426 may include an arm or tang that helps to prevent the hinge cam pivot 426 from rotating when it is acted on by the cable. Details of an example hinge pivot cam are also include with reference to FIGS. 9 and 10.

In some examples, a control system 431 and a communications system 433 may be electrically connected to the apparatus 400. In some examples, the control system 431 may be similar to the control system 104 of FIG. 1 with similar capabilities, in some examples, the communications system 433 may be similar to the communications system 106 of FIG. 1 with similar capabilities. In some examples the communications system 433 may be used to send and receive remote signals and information. In some examples the control system 431 may be used to send and receive signals and information. In some examples, the control system 431 may be used to receive a remote signal to move or alter the position of closing mechanism 403 and send or communicate a signal to the apparatus 400 to move or alter the position of the closing mechanism 403. In some examples, the communication system 433 may be used communicate various information with and about the apparatus 400 and control system 431. In some examples, this communicated information may include a status of the apparatus 400, a positional status of the door such as if the door is in an open position or a closed position, a status of the control system 431, communicate a signal to the control system 431, receive a communication or a signal from the control system 431, etc.

In some examples, the apparatus 400, the control system 431, and the communications systems 433 may include a sensor that may be used to indicate if the door is in an open position or a closed position. In some examples, the sensor is a proximity sensor. In some examples, the apparatus may include additional sensors or communication components.

In some examples the apparatus 400 may also be referred to as an emergency door closing device 400. In some examples the spring 406 may also be referred to as a main torsion spring 406. In some examples the coupling member 408 may be referred to as a solenoid lever 408. In some examples the hinge assembly 410 may be referred to as a residential hinge assembly 410, In some examples the movement generator 412 may be referred to as a battery operated solenoid 412. In some examples the tension member 420 may be referred to as a cable 420. In some examples the hinge pivot cam 426 may be referred to as a pivot cam 426. In some examples the power supply 430 may be referred to as a battery 430. In some examples the spring 440 may be referred to as a lever torsion spring 440. In some examples the pawl 441 may be referred to as the pawl feature 441.

In use, the apparatus 400 may be positioned in a primed state and an unprimed state. In the unprimed state, there is little to no energy stored in the spring 406. In the primed state, energy is stored within the spring 406. The apparatus 400 may be transitioned from the unprimed state to the primed state when the door is initially opened.

In use, the tension member 420 may wrap and unwrap around a portion of the hinge pivot cam 426 when the door is moved between open and closed positions. In some examples, the wrapping of the tension member 420 about the hinge pivot cam 426 changes or decreases the effective length of the tension member 420.

In use, in the unprimed state, the spring 406 may be used to position the closing cam 404 at a location where the spring 406 has little to zero energy stored within it. If there is not slack in the tension member 420, a small force may be applied on the closing cam 404, such that a small amount of energy may be stored in the spring 406. The user may feel the spring tension from spring 406 when the user moves the door from a closed position to an open position, as the tension member 420 forces the closing cam 404 to move, thereby overcoming the force in the spring 406.

As the door opens, the tension member 420 wraps around the hinge pivot cam 426, and the effective length of the tension member 420 is reduced. As the effective length of the tension member 420 is reduced, a tension created in the tension member 420 overcomes the force of the spring 406 and forces the closing cam 404 downwards and/or in a clockwise motion. A stored energy in the spring 440 may force the pawl 441 between teeth of the gear 442 on closing cam 404 so the energy developed in the spring 406 as the door was opened is stored and not released, when the user stops moving the door. When the door is opened to or near its maximum opening angle, the closing mechanism 403 is in a primed state. The energy is stored in the spring 406 and the door can operated normally (opened and closed without the user feeling the spring force associated with rotating the closing cam 404).

When the closing mechanism is in the primed state and the door is closed, there may be little to zero tension in the tension member 420 and the tension member 420 may be slack but routed along a groove in the closing cam 404. When the apparatus 400 receives a signal, such as that transmitted by the control system 431, the movement generator 412 moves the pawl 441, and allows the stored energy in the spring 406 to be released. This energy release of spring 406 causes the spring 406 to act upon the end of the closing cam 404 to move the closing cam 404 in an upwards and/or counter clockwise motion. The motion of the closing cam 404 applies a tension on the tension member 420, which then pulls the door shut, or moves the door into the closed position. In some examples, the movement generator 412 is a solenoid and moves the moveable plunger member 413 in direction so that the pawl 441 disengages with teeth on the gear 442, which allows the energy stored in the spring 406 to be released.

In some examples, the control system 431 includes a timer which may be used to control the position of the pawl 441 for an established period of time once the signal is transmitted by the control system 431 and the energy in the spring 406 has been released. This period of time may allow for a time delay for the energy stored with the spring 406 to be fully released so that the door is fully moved into a closed position. In some examples, the energy in the spring 406 may be considered released when most or all of the potential energy stored in the spring 406 is converted to kinetic energy to move the door in to the closed position.

Once the established period of time has elapsed, the movement generator 412 may move the pawl 441 to engage teeth of the gear 442 again and the closing mechanism is repositioned into the unprimed state. The closing mechanism 403 may be transitioned from the unprimed state to the primed state when the door is opened again.

FIG. 3 is a perspective view of an example apparatus in accordance with the present disclosure. In some examples, the apparatus of FIG. 3 may be similar to the example apparatus described in FIG. 2 and use similar components with similar naming conventions and numbering. In some examples, like components may have like numbering. FIG. 3 shows an apparatus 600 with a closing mechanism 603, a tension member 620, a base plate 402, a closing cam 604, a spring 606, a coupling member 608, a cable disk 613, a hinge assembly 410, a movement generator 412, a moveable plunger member 413, a hinge pin 416, a tension member 620, a ratchet assembly 621, a hinge pivot cam 426, a power supply 430, a spring 640, a pawl 641, and a gear 642. FIG. 3 also shows a control system 430 and a communications system 433.

The apparatus 600 of FIG. 3 may differ from that of FIG. 2 in that the closing cam 604 may be curved so that the tension member 620 may be pulled to rotate the closing cam 604 in a clockwise position as the door is opened.

In some examples, the apparatus 600 includes a tension member 620 that is coupled to a cable disk 613 on one end, which may contain a roller bearing, and coupled to a pivot cam 626 on the other end. The cable disk 613 may be held in place against the curved closing cam 604 by an initial spring force of spring 606 and a mating groove formed between the closing cam 604 and the base plate 402. The closing cam 604 may be pivotally coupled to the base plate via a pin 423 positioned at one end of the closing cam 604. The end of the closing cam adjacent the pin 423 may include the gear 642. In the resting state, the spring 606 may have little to zero energy stored within it. In some examples, there may be a small amount of energy stored in the spring 606 to help remove slack within the tension member 620.

Similar to the apparatus of FIG. 2, the coupling member 608 may include the pawl 641 that engages teeth on the gear 642 on the closing cam 604. In some examples, the gear 642 may include a plurality of asymmetrical teeth that allow the pawl 641 to be progressively moved between the plurality of teeth as the door is opened to thereby progressively increase the potential energy stored in the spring 606.

In use, the user may be able to feel the spring tension of spring 606 when they open the door. As the door opens, the tension member 620 may wrap about a portion of the hinge pivot cam 426 so that the effective length of the tension member 620 between the hinge pivot cam 426 and the base plate 402 is reduced. As the effective length of the tension member 620 is reduced, the tension member 620 forces the closing cam 604 to rotate in a clockwise direction about the pin 423 and may change the moment arm relationship between the curved closing cam 604 and the cable disk 613. This movement against the spring 606 may create a torque. In use, the spring 640 may help force the pawl 641 between the teeth on the gear 642 of the closing cam 604 so that the energy developed in the spring 606 as the door is opened is stored.

When the door is generally fully open the apparatus 600 may be positioned in a primed state. In the primed state, energy is stored within the spring 606 and door may be operated normally (open and closed with the user feeling little to zero of the spring force of spring 606). When the apparatus is in the primed position and the door is closed, the tension member 620 may be slack and the cable disk 613 may float against the cam closer 604. Upon receipt of the signal, the movement generator 412 may move the moveable plunger member 413 so that the pawl 641 disengages from the gear 642 and the energy stored within the spring 606 is released. As the energy is released, the tension member 620 unwinds from the hinge pivot cam 426 and the door may be moved from the open position to a. closed position.

Figure 4A:
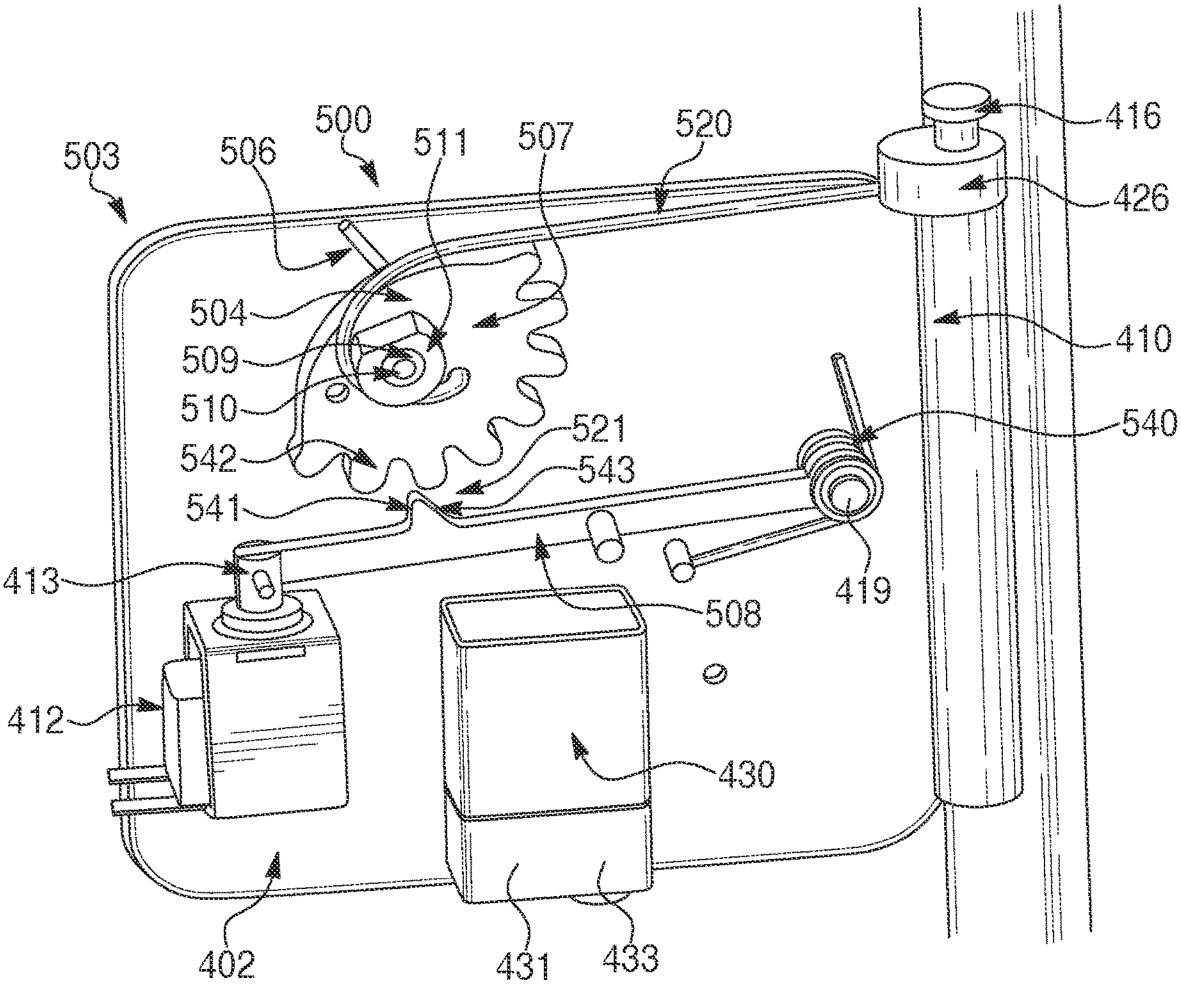
FIG. 4*a* is a perspective view of example apparatus in accordance with the present disclosure.
Figure 4B:
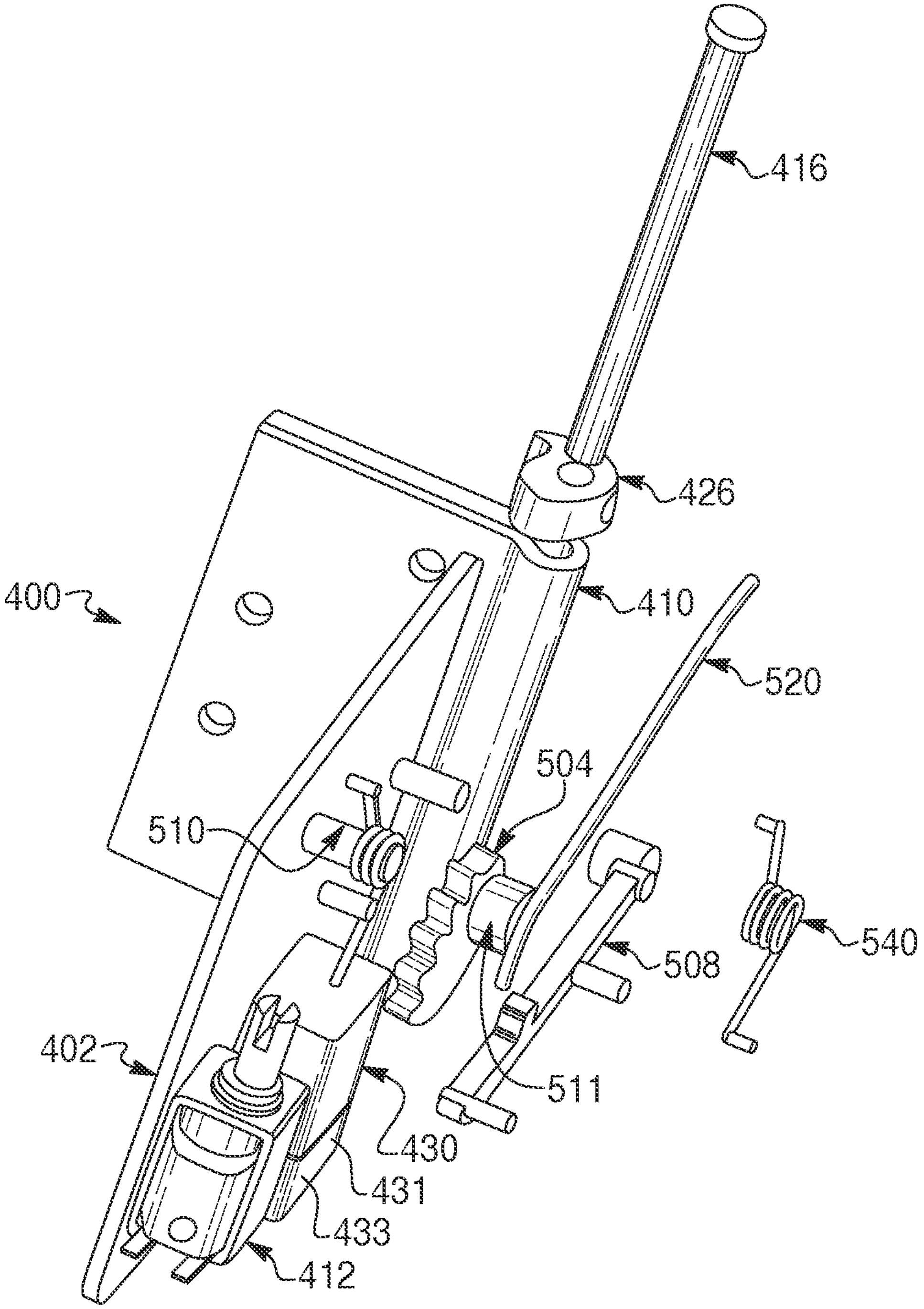
FIG. 4*b* is an exploded view of the example apparatus of FIG. 4 *a*.

Another example apparatus 500 is shown in FIGS. 4*a*, 4*b*, 7, and 8. In some examples, the apparatus of FIGS. 4*a*-4*b* may be similar to the example apparatus described in FIGS. 2 and 3 and use similar components with similar naming conventions and numbering. FIGS. 4*a*-4*b* show an apparatus 500 with a closing mechanism 503, a tension member 520, a base plate 402, a closing cam 504, a spring 506, a coupling member 508, a hinge assembly 410, a movement generator 412, a moveable plunger member 413, a hinge pin 516. a tension member 520, a ratchet assembly 521, a pin 419, a pin 423, a hinge pivot cam 426, a power supply 430, a spring 540, a pawl 541, and a gear 542. FIGS. 4*a*-4*b* also show a control system 431 and a communications system 433.

In some examples, the apparatus 500 includes a closing mechanism 503 with a closing cam 504. In some examples, apparatus 500 may include a ratchet assembly 521 with a pawl 541 that engages the gear teeth 542. on the closing cam 504.

In some examples, the closing cam 504 may include the gear 542. Similar to the apparatus of FIG. 2, the gear 542 may have at least a partially round perimeter forming an outside diameter and a flat face, with teeth formed on at least a portion of the outside diameter. The closing cam 504 may include a main body portion including a flat plate 507, wherein the plurality of teeth of the gear 542 are located on and extend outwardly from an outer edge of the flat plate 507. In some examples, a protrusion 511 may extend away from the flat plate 507 and be centered about a pin 510. In some examples, the closing cam 504 may be rotatably and biasingly coupled to the base plate 402 at the pin 510. The closing cam 504 may be releasably held in place via the pawl 541 of the coupling member 508. In some examples, the pawl 541 may be used to move in and out from between any two of the plurality of teeth of the gear 542 via the pivoting motion of the coupling member 508 about the pin 419. In some examples, the pawl 541 includes a cam surface 543 on one side to allow the pawl 541 to progressively move between the plurality of teeth on the gear 542 as the existing door is moved from the closed positon into the open positon. The progressive movement of the pawl 541 may allow for the progressive increase of potential energy or stored energy the spring 506.

In some examples, a center aperture 509 extends through the flat plate 507 and the protrusion 511. In some examples the center aperture 509 adapted to receive and pivot about the pin 510 that couples the closing cam 504 to the base plate 402. The pin 510 may pivotally or rotatably hold the closing cam 504 and gear 542 in place with respect to the base plate 402. In some examples, the protrusion 511 is oblong shaped and the tension member 520 may be coupled to the protrusion 511. This may help to increase the wrap distance of the tension member 520 about the protrusion 511 as the door is opened.

In some examples, similar to the apparatuses of FIGS. 2 and 3, the tension member 520 is coupled on one end to the closing cam 504 and on the other end to the hinge pivot cam 426. In some examples, the tension member 520 is routed around and/or through the protrusion 511 of the closing cam 504. In some examples, an end of the tension member 520 may be coupled to a surface of the main body of the closing cam 504 at a distance from the protrusion 511 such that when the closing cam 504 is rotated or pivoted, the distance the tension member 520 is pulled is maximized. In some examples, the maximized distance the tension member 520 is pulled may also be referred to as the minimized effective length of the tension member 520 between the closing cam 504 and the hinge pivot cam 426.

In use, a stored energy in the spring 540 may force the pawl 541 between teeth of the gear 542. In some examples, the pawl 541 and the stored energy of the spring 540 may prevent the rotation of the gear 542, even when energy is stored in the spring 506. The movement generator 412 may be used to move an end of coupling member 508 member to thereby overcome the spring force of the spring 540 and pivot the coupling member 508 to move the pawl 541 out from in between the any two of the plurality of teeth of the gear 542. This may allow the spring 506 to release the stored potential energy and thereby close the existing door.

In use, when the door is moved to a partially open or open position, the closing mechanism 503 is transitioned to a primed state. The energy stored in the spring 506 is prevented from or resists release by the engagement of the pawl 541 in the teeth of the gear 542.

Figure 8:
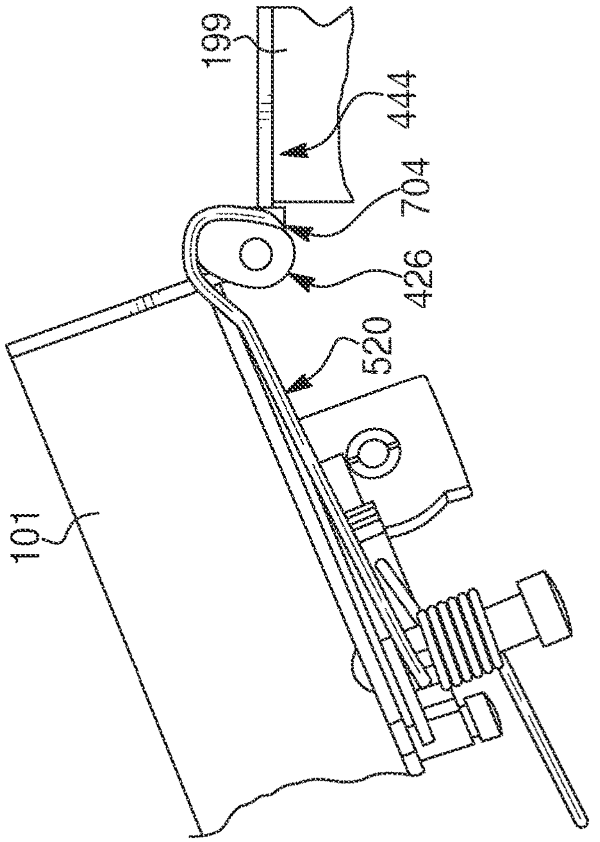
FIG. 8 is a top view of the example apparatus of FIG. 4*a* with a door in an open position.
Figure 7:
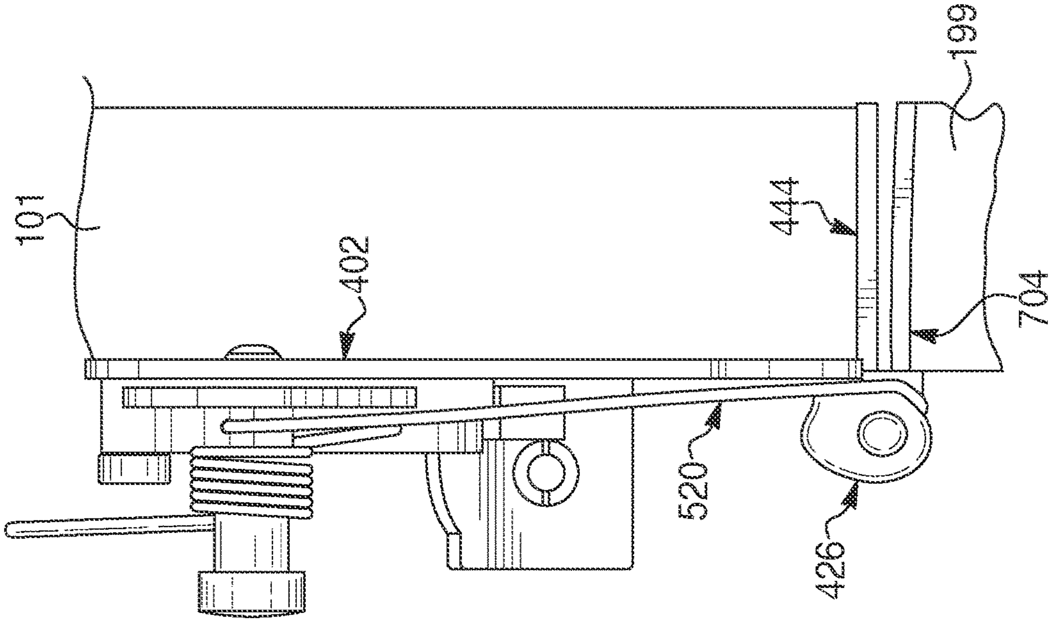
FIG. 7 is a top view of the example apparatus of FIG. 4*a* with a door in a closed position.

FIG. 7 is a top view of the example apparatus of FIG. 4*a* with a door in a closed position. FIG. 8 is a top view of the example apparatus of FIG. 4*a* with a door in an open position. As shown in FIGS. 7 and 8, when the existing door 101 is pivoted from a closed position (FIG. 7) adjacent a door frame, jamb, or other structure 199, into an open position (FIG. 8), the tension member 520 partially wraps around the hinge pivot cam 426. The wrapping of the tension member 520 shortens or decreases the effective length of the tension member 520, and the tension member 520 then pulls upon and rotates the closing cam 504.

When in the primed state, in some examples, the door 101 can operated normally, such that user may move the door from the open position back to the closed position and vice versa without substantially feeling an interaction from the spring 506. When the closing mechanism 503 is in the primed state and the door is in the closed position, the tension member 520 may be slack such that there is little to no tension in the tension member 520. When a signal is received by the apparatus, the movement generator 412 may move the coupling member 508 and pawl 541 so that the pawl 541 disengages from the gear 542. Upon the disengagement of the pawl 541 from the gear 542, the energy stored in the spring 506 is released. This energy release may result in the closing cam 504 rotating to pull the tension member 520. As the tension member 520 is pulled, it is unwrapped from about the protrusion 511 and the hinge pivot cam 426, and the door is pivotally pulled into the closed position.

In some examples, the movement generator 412 may include a battery operated solenoid or motor with PCB and relay control. In some examples where the movement generator 412 is a solenoid, the solenoid may overcome the force or stored energy within the spring 540 to disengage the pawl 541. In some examples, the movement generator 412 releases with a timer. The closing mechanism 503 may be automatically repositioned in to the primed state when the door is opened and the spring 506 has released its energy.

Figure 6:
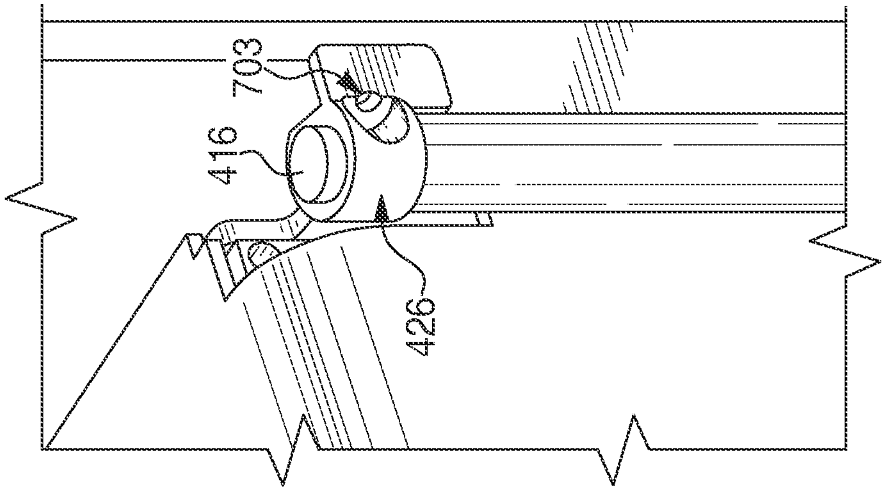
FIG. 6 is an enlarged view of the example apparatus of FIG. 5.
Figure 5:
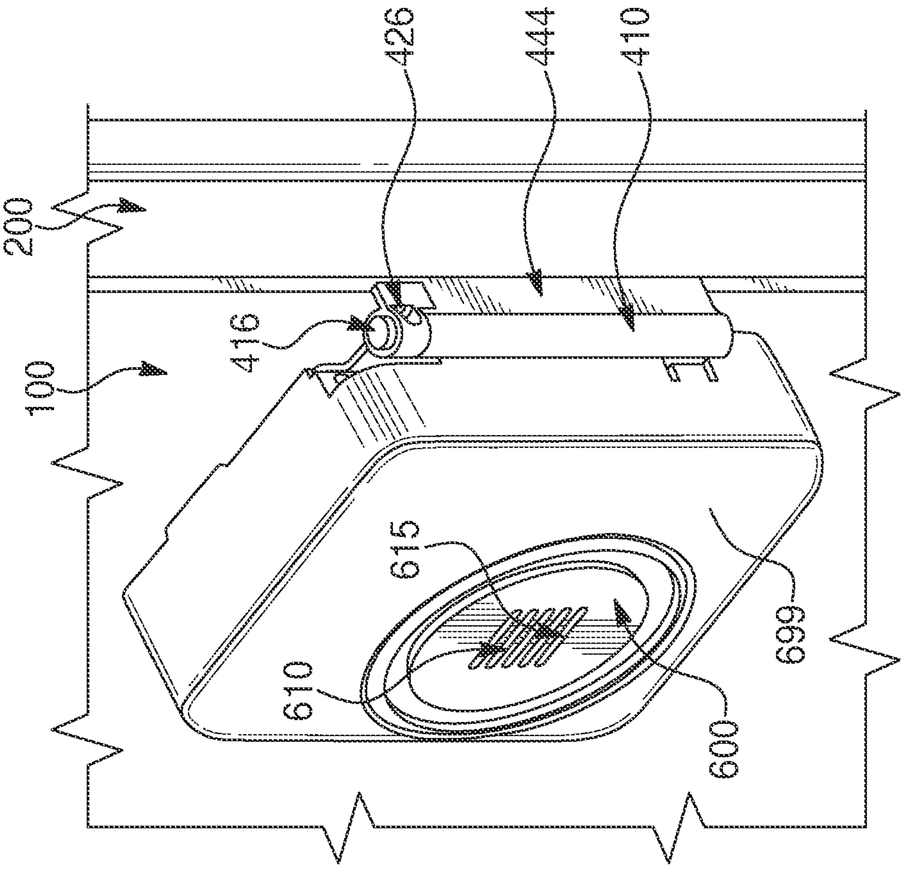
FIG. 5 is a perspective view of an example apparatus in accordance with the present disclosure installed on an existing door and door hinge.

FIG. 5 is a perspective view of an example apparatus in accordance with the present disclosure installed upon an existing door and door hinge. FIG. 6 is an enlarged view of the example apparatus of FIG. 5. FIG. 5 shows an example apparatus 200 mounted to a door. In some examples, the apparatus 200 is similar to the apparatus 100, 400, 500, 600 of FIGS. 1-4. In some examples, the apparatus includes an alarm member that may emit an audible sound when an emergency event, such as fire, smoke, or an emergency signal is detected, and wherein the alarm member may include a speaker 615. The apparatus 200 may include, in some examples, a cover with slots or apertures to allow for a user to better hear or see an audible or visual signal.

Figure 11:
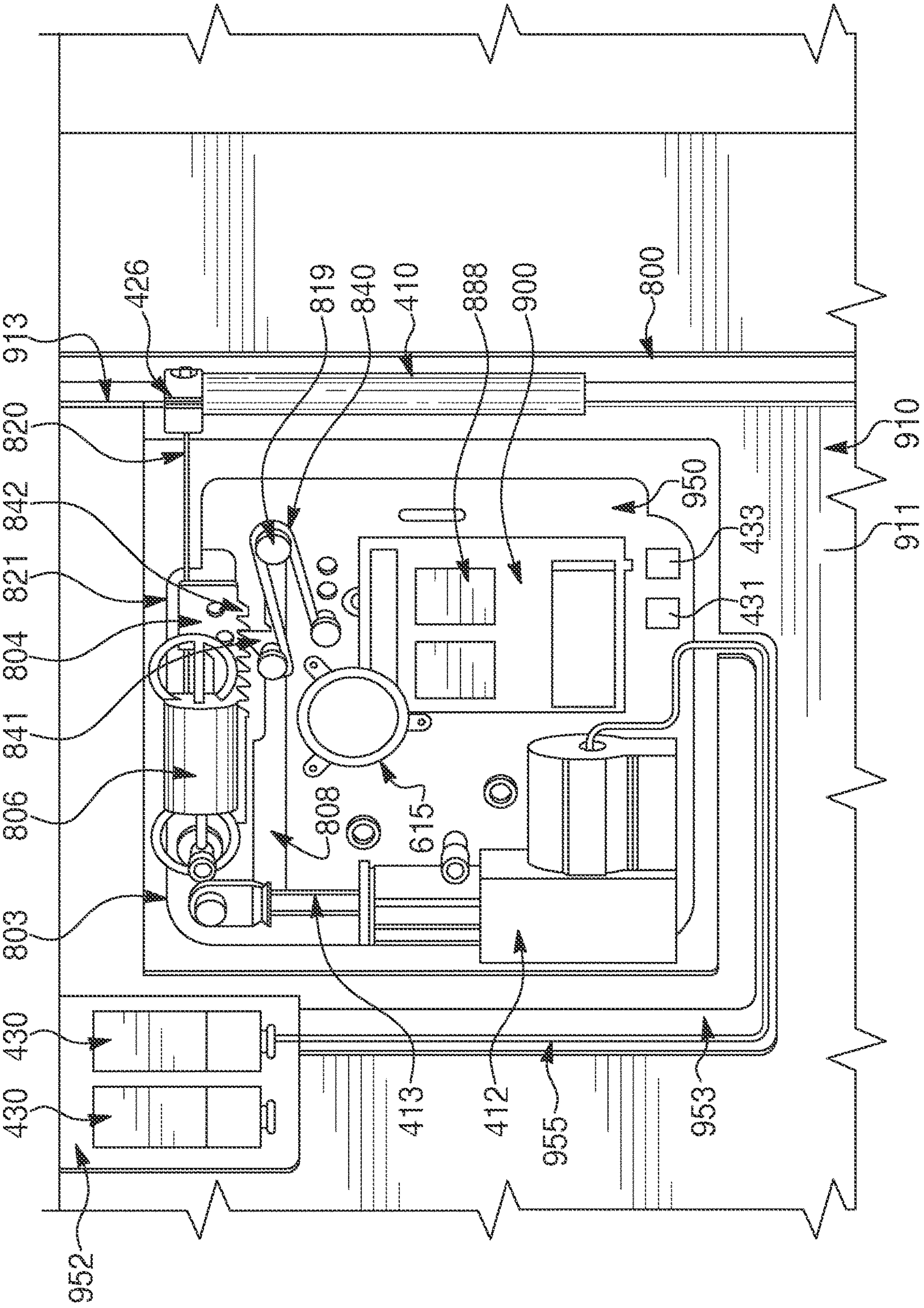
FIG. 11 is a perspective view of an example apparatus in accordance with the present disclosure.
Figure 12:
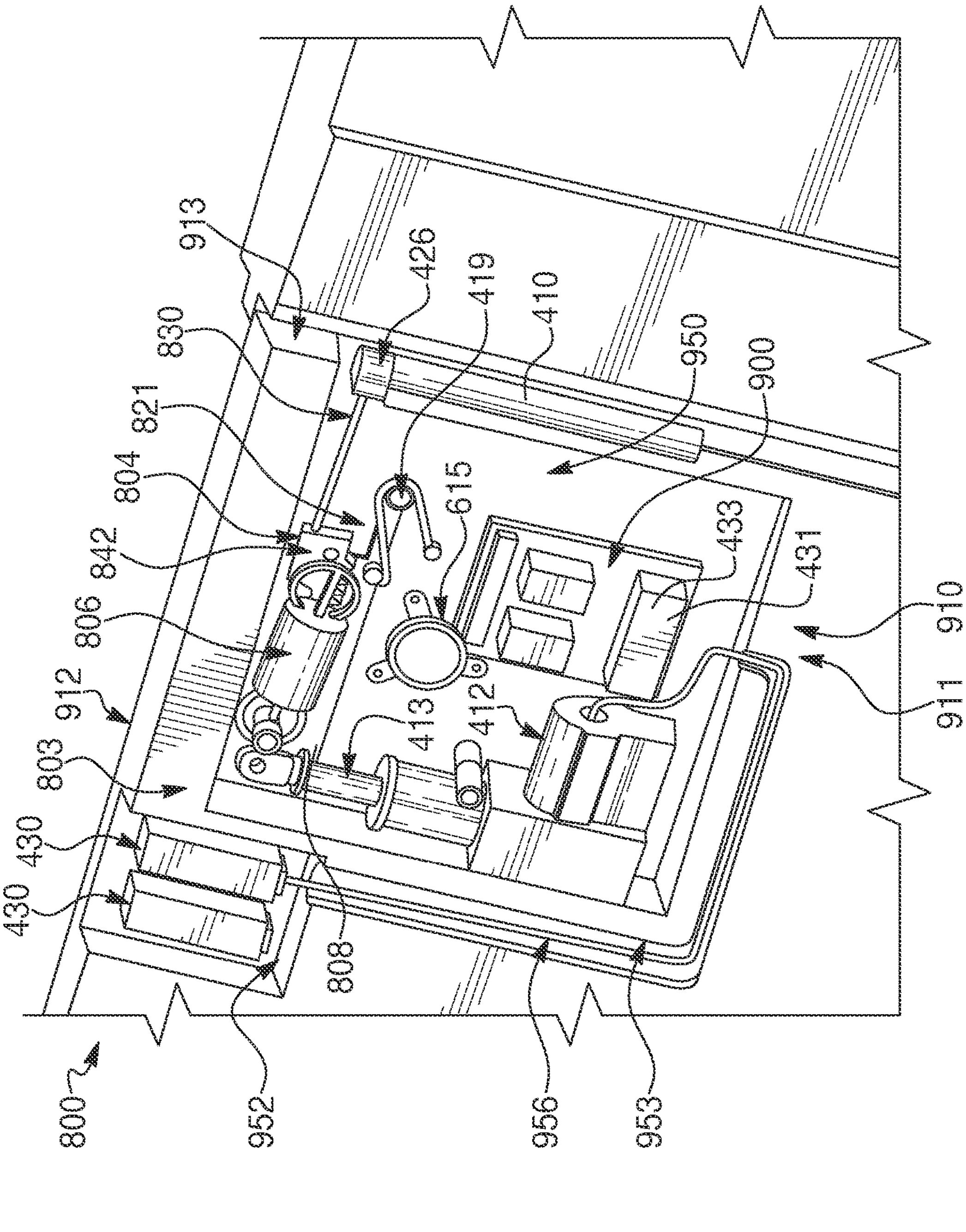
FIG. 12 is an alternate perspective view of the apparatus of FIG. 11.
Figure 13:
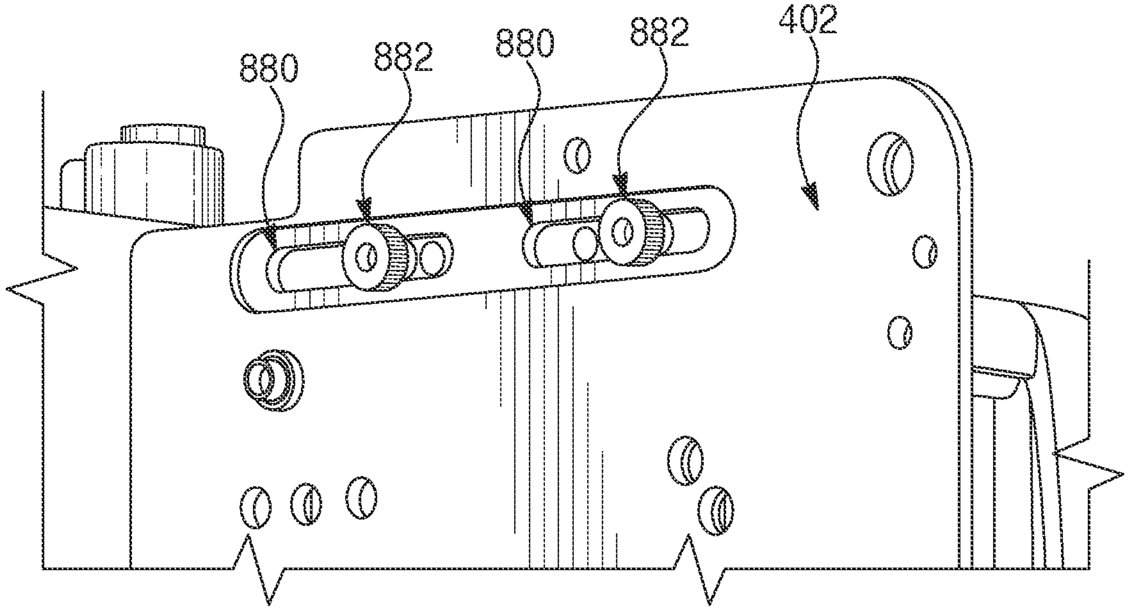
FIG. 13 is a rear perspective view of the apparatus of FIG. 11.

Another example of an apparatus is shown in FIGS. 11-13 and 15. In some examples, the apparatus of 11-13 and 15 may be similar to the example apparatus described in FIGS. 2-4 *b* and use similar components with similar naming conventions and numbering. FIGS. 11-13 show an apparatus 800 with a closing mechanism 803, a base plate 402, a closing bar 804, a spring 806, a coupling member 808, a hinge assembly 410, a movement generator 412, a moveable plunger member 413, a pin 819, a tension member 820, a ratchet assembly 821, two slide members 882, a hinge pivot cam 426, a power supply 430, a spring 840, a pawl 841, and a gear 842. FIGS. 11-13 also show a control system 431 and a communications system 433.

Figure 15:
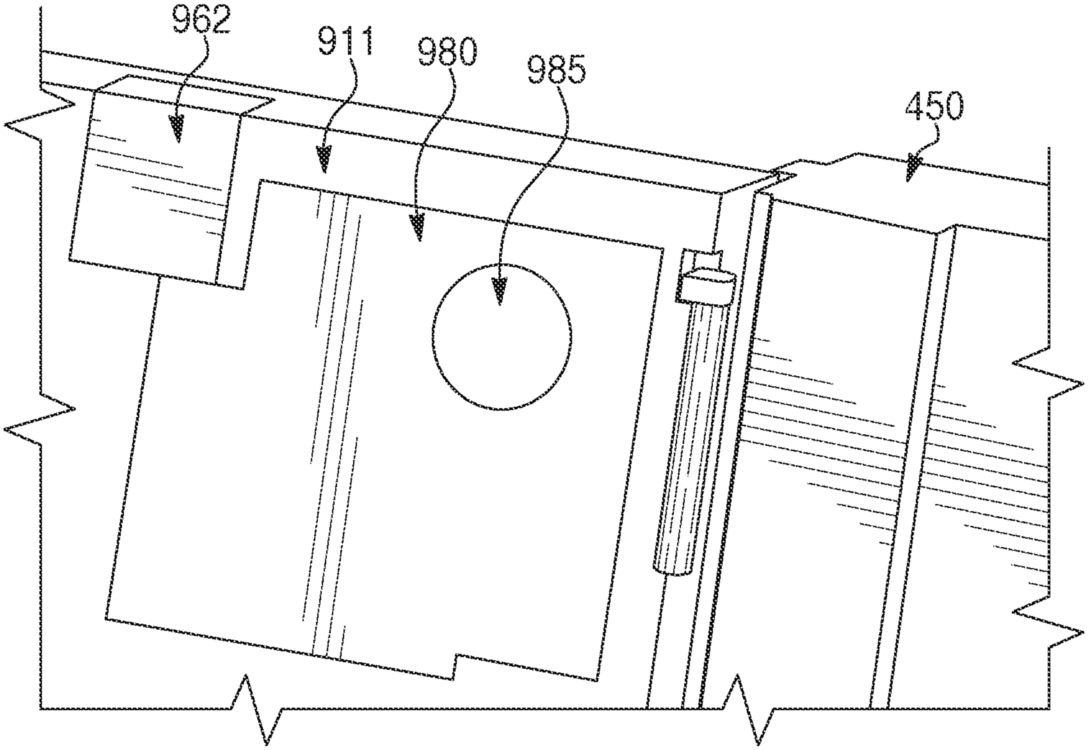
FIG. 15 is a perspective view of the apparatus of FIG. 11 including first and second cover members covering first, second, and third cut-out sections of a door member.

FIG. 11 is a perspective view of an example apparatus in accordance with the present disclosure. FIG. 12 is an alternate perspective view of the apparatus of FIG. 11. FIG. 13 is a rear perspective view of the apparatus of FIG. 11. FIG. 15 is a perspective view of the apparatus of FIG. 11 including first and second cover members covering first, second, and third cut-out sections of a door member.

In some examples, the apparatus 800 may be similar to previously described examples. In some examples, the apparatus 800 may be different than previously described apparatuses in that the rotating closing cam 404, 504, 604 and gear 442, 542, 642 are replaced with a linearly moving closing bar 804 with teeth 842. Similar to other apparatus examples, the pawl 841 may be releasably retained or positioned between any two of the plurality of teeth 842. The coupling member 808 may include the pawl 841 and may be biased by a spring 840 about pin 419. The spring 840 may bias the pawl 841 towards the teeth 842.

A movement of the door from the closed position to the open position will linearly move the closing bar 804 and store energy in the spring 806. In some examples, the tension member 820 may be coupled to the closing bar 804, such that when the existing door is pivoted into the open position the tension member 820 partially wraps around the hinge pivot cam 426 and pulls upon and linearly moves the closing bar 804. As the door is initially moved from a closed position to the open position, the closing mechanism 803 may be moved or transitioned in to a primed position. Similar to other examples of the apparatus, the spring 806 is prevented from releasing the energy by the pawl 841 engagement with the teeth 842.

In some examples, the movement generator 412 may include a motor or solenoid and a moveable plunger member 413 mechanically connected to and linearly movable via the movement generator 412. The movement generator 412 may be coupled to the base plate 402. The moveable plunger member 413 may couple the movement generator 812 with an end of the coupling member 808 opposite the pin 419

In use, the pawl 841 may move in and out from between the any two of the plurality of gear teeth 842 via the pivoting motion of the coupling member 808. Upon receipt of a signal, the movement generator 412 may move the moveable plunger member 413 to pull down upon the end of the coupling member 808 and disengage the pawl 841 form the gear teeth 842. This may allow the energy stored within the spring 806 to be released and thereby close the existing door. The spring 806 pulls on closing bar 804 with a linear force, which in turn pulls on the tension member 820. The tension member 820 unwraps from around the hinge pivot cam 426 to move the door from the open position to a closed position In some examples, an alarm, such as a fire, smoke, and emergency signal is electrically connected to the apparatus 800 and the apparatus 800 may send an electric signal to the movement generator 412 when fire, smoke, or an emergency is detected.

In some examples, as shown in FIG. 13, the base plate 402 of the apparatus may include two linearly extending openings 880. The openings may be generally horizontal. In some examples, the closing bar 804 may include two slide members 882 that protrude or extend in a horizontal direction through the linearly extending openings 880 of the base plate 402. In some examples, the slide members 882 are used to slidably engage the two linearly extending openings 880 of the base plate 402. In some examples, the closing bar 804 may be moved linearly back-and-forth when in the primed state and unprimed state, and the two side members 882 slide back and forth in their respective openings 880.

In some examples, as shown in FIGS. 11, 12, and 15, the apparatus 800 (and other examples of the apparatus disclosed herein) may be used in combination with a door 910. In some examples, the apparatus is mounted to a front surface of the door. In some examples, the apparatus is mounted within various cut-out sections of a door.

The door 910 may include a front surface 911, a back surface 912, and an edge surface 913, wherein the front surface 911, the back surface 912, the said edge surface 913 may form an interior volume. In some examples, at least one hinge 410 may include including a first plate 445 removably connected to the edge surface 913 of the door 910, a second plate 446 removably connected to a door frame 450, and a hinge pin 416 adapted to pivotally connect the first plate 445 and second plate 446 together. The hinge 410 may be used to pivotally connect the door 910 to the door frame 450.

In some examples, the front surface 911 and interior volume include a first cut-out section 950 located in proximity to one of the at least one hinge 410. The first cut-out section 950 may retain the base plate 402 of the apparatus. A second cut-out section 952 may be located in proximity to the first cut-out section 950 and may be used to retain the power source 430 of the apparatus. In some examples, a third cut-out section 953 is located and coupled in between the first cut-out section 950 and the second cut-out section 952. The third cut-out section may retain electrical wires 955 of the apparatus. The electrical wires 955 may electrically connect various components of the apparatus, such as the power source 430, the communications system 433, the control system 431, alarms or notification assemblies such as a fire, smoke, poisonous gas detector, etc. as well as supply electric power thereto from the power supply 430.

In some examples, the apparatus may include a first cover member 980 removably coupled to the front surface of the door and removably covering the first and third cut-out portions of the door. A second cover member 982 may be removably coupled to the front surface of the door and removably cover the second cut-out portion of the door.

As shown in FIG. 11, in some examples, the apparatus may include a light emitting diode (LED) 888. As shown in FIG. 15, the first cover member 980 may include a translucent portion 985 positioned adjacent the LED 888 as to allow light from the LED 888 to be seen by a user.

In use, the LED 888 may be activated when a signal is received by the apparatus. In some examples, the LED 888 may be activated when an alarm, such as a fire, smoke, and emergency alarm sends an electric signal to the control system 431. In some examples, when the LED 888 is activated, the light from the LED may show through or be viewed through the first cover member 980.

Figure 16:
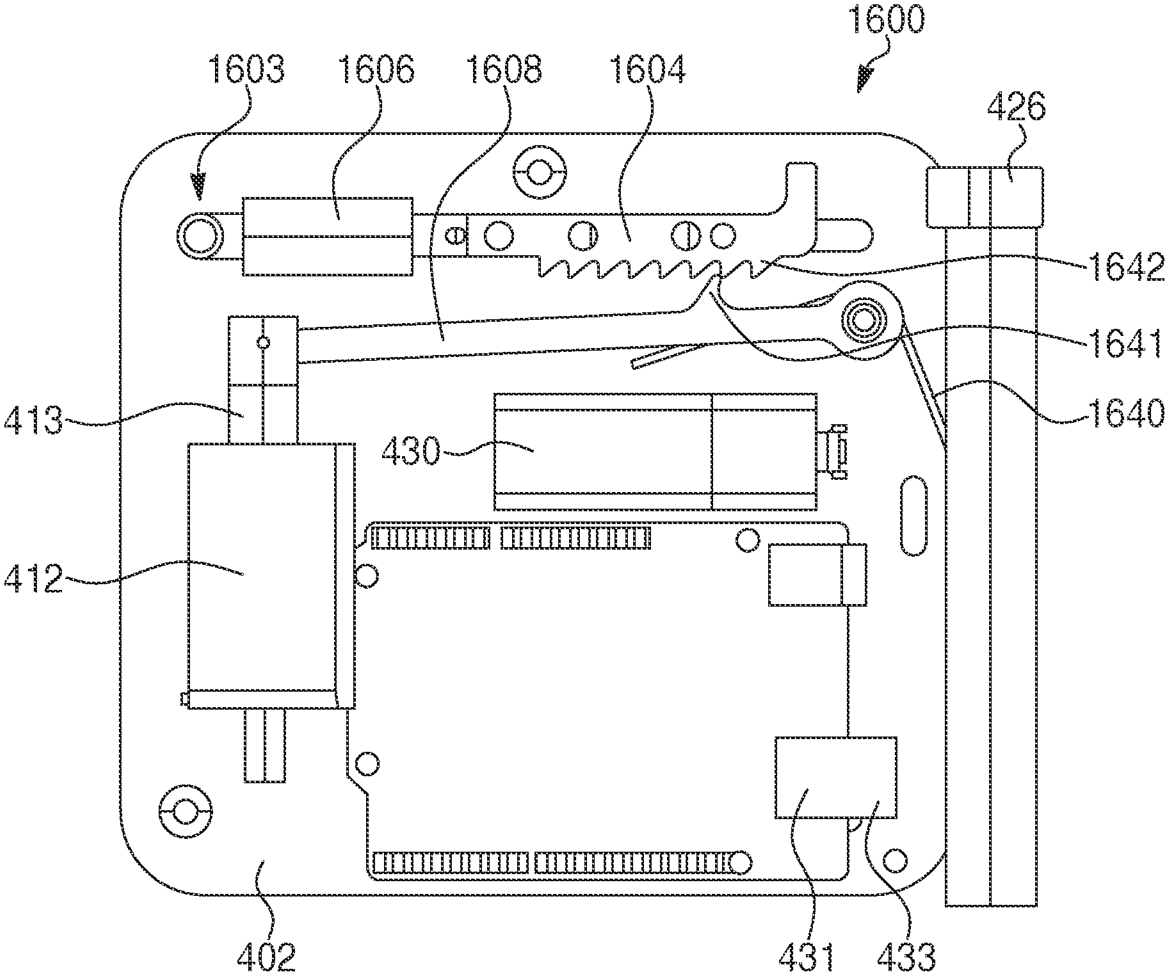
FIG. 16 is a front elevation view of an example apparatus in accordance with the present disclosure.

Another example apparatus to close a door is shown in FIG. 16. FIG. 16 is a front elevation view of an example apparatus 1600 in accordance with the present disclosure. The apparatus 1600 may be similar to the apparatus 800 of FIGS. 11 and 12. A difference between the apparatus 800 and apparatus 1600 may be that the apparatus 1600 is shown as it would be used to mount to the surface of a door. Similar to previous described examples, the apparatus 1600 may include a base plate 402, a movement generator 412, a moveable plunger member 413, a hinge pivot cam 426, and power supply 430, a control system 431, and a communications system 433. In some examples, the apparatus 1100 may also include a closing mechanism 1603 with a spring 1606 coupled to a closing bar 1604 with teeth 1642, the closing bar coupled to via a tension member (not shown) to the hinge pivot cam 426. The apparatus 1600 may also include a coupling member 1608 with a pawl 1641 that is biasedly engaged with the teeth 1642.

Figure 17:
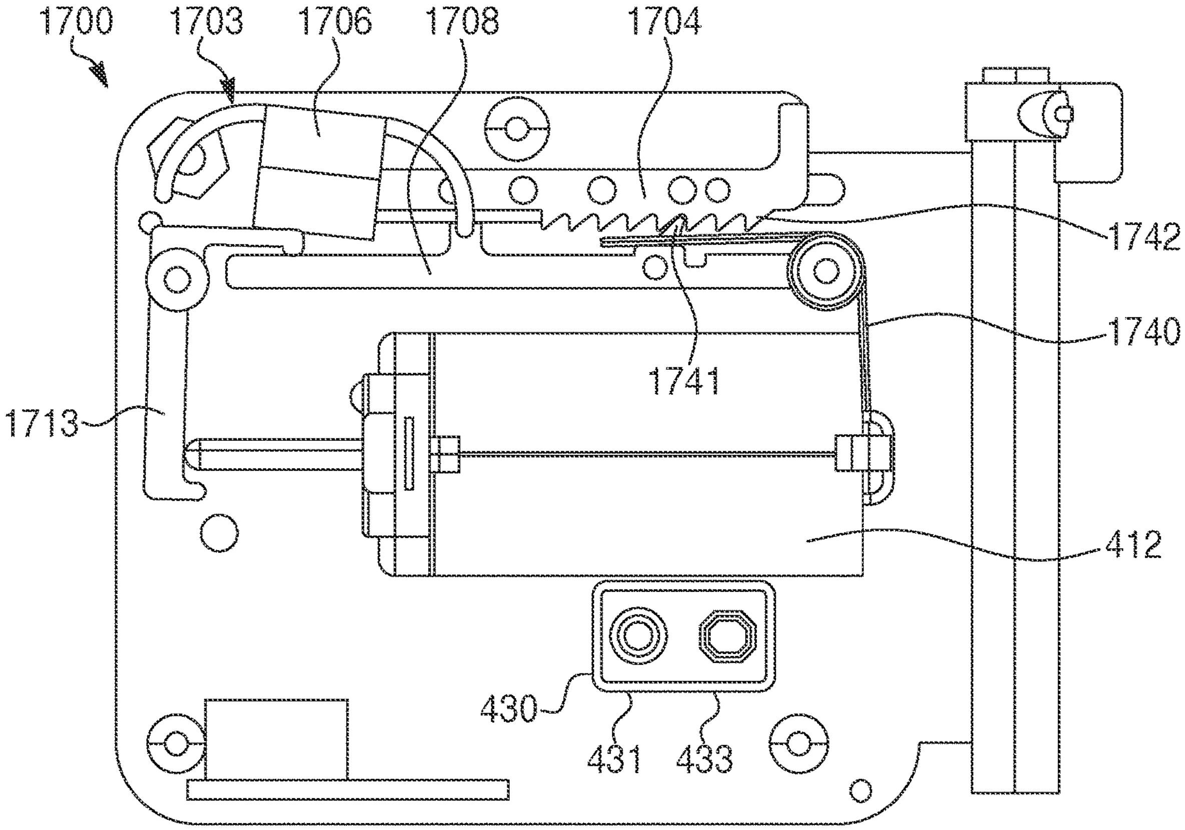
FIG. 17 is a front elevation view of an example apparatus in accordance with the present disclosure.

In use, a user moves the door from a closed position to an open position. The door movement causes the tension member (not pictured) to wrap around the hinge pivot cam 426, moving the closing bar 1604 and imparting energy into the spring 1606. The pawl 1641 prevents the newly developed and stored energy within the spring 1606 from being prematurely released. As the door is rotated to an open position, the closing mechanism 1603 is transitioned into a primed state. Once in the primed state, the door may be opened and shut without the user experiencing resistance that may normally be present with the use and position of the spring 406. Upon receipt of a signal, the controller may send a signal to the movement generator 412 to move so that the pawl 1641 is released from the teeth 1642, and the stored energy in the spring 1606 is released Another example apparatus to close a door in response to a signal is shown in FIG. 17. FIG. 17 is a front elevation view of an example apparatus 1700 in accordance with the present disclosure. In some examples, the apparatus of FIG. 17 may be similar to previously described examples of apparatuses and use similar components with similar naming conventions and numbering. FIG. 17 shows an apparatus 1700 with a closing mechanism 1703, a closing bar 1704, a coupling member 1708, a spring 1706, a spring 1740, a pawl 1741, teeth 1742, a movement generator 412 and a moveable plunger member 1713. At a minimum, the apparatus 1700 may be similar to the apparatus 400, 500, 600, 1100 of FIGS. 2-4 and 1. The apparatus 1700 may be different in that the moveable plunger member 1713 may be "L" shaped, such that in use and in response to a signal, the movement generator 412 may horizontally extend to rotate an end of the moveable plunger member 1713 in a clockwise direction. The clockwise rotation of the moveable plunger member 1713 may then push down on a first end of the coupling member 1708 to disengage the biased pawl 1741 from the teeth 1742 and thereby release stored energy in the spring 1706. In order to disengage the pawl 1741, the force and associated moment created by the contact between the moveable plunger member 1713 and the first end of the coupling member 1708 would need to overcome the biasing force of any energy stored in the spring 1740. In some examples, the apparatus 1700 may use a movement generator 412 that is a solenoid.

Figure 18:
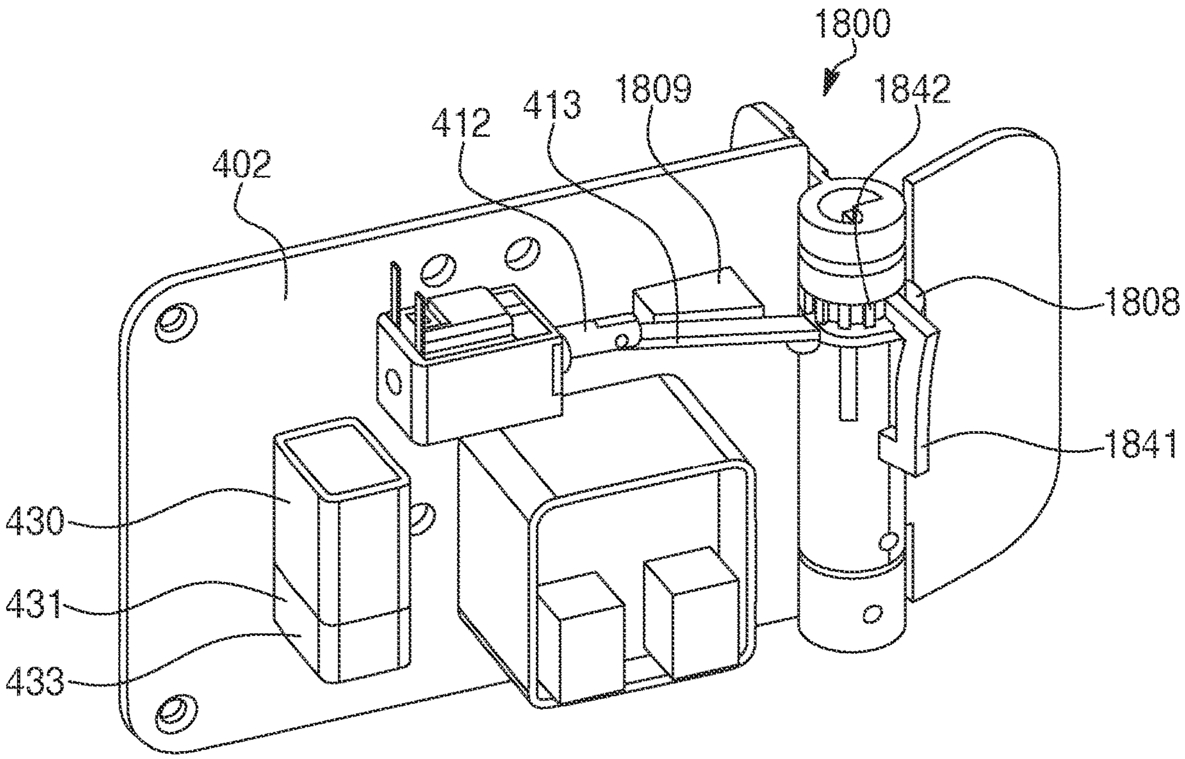
FIG. 18 is a perspective view of an example apparatus in accordance with the present disclosure.

Another example apparatus to close a door in response to a signal is shown in FIG. 18. FIG. 18 is a perspective view of an example apparatus 1800 in accordance with the present disclosure. In some examples, the apparatus of FIG. 18 may be similar to previously described examples of apparatuses and use similar components with similar naming conventions and numbering. FIG. 18 shows an apparatus 1800 with a closing mechanism 1803, a wedge 1808, a wedge 1809, a pawl 1841, gear teeth 1842, a power supply 430, a control system 431, a communications system 433, a movement generator 412 and a moveable plunger member 413. In some examples, the various components of the apparatus 1800 may be similar in style and use to the components of the previously described apparatuses. In the example of FIG. 18, a portion of the closing mechanism 1403 may be coupled to or form part of the hinge assembly for the door. In addition, the movement generator 412 may be coupled to the moveable plunger member 413. The moveable plunger member 413 may be positioned adjacent a wedge 1809 coupled to the base plate 402 so that the moveable plunger member 413 aligns with properly with an additional wedge 1808 and pawl 1841. The moveable plunger member 413 may be coupled to the wedge 1808. The wedge 1808 may not be directly coupled to the pawl 1841, but may be positioned on an inside of the pawl 1841 between the pawl 1841 and the hinge. The wedge 1808 may form a circular or partially circular wedge between the hinge and the pawl 1841. In an example, the apparatus 1800 may also include gear teeth 1842 that form an outer circumferential perimeter of part of the hinge.

In response to a signal, the wedge 1808 may be used to disengage the pawl 1841 from the gear teeth 1842. In response to the signal, the wedge 1808 may be moved or rotated so that the pawl 1841 is pushed radially outward and away from the gear teeth 1842. The disengagement of the pawl 1841 form the gear teeth 1842 may allow the release of stored energy of various components of the closing mechanism 1803 positioned within the hinge.

Another example apparatus to close a door in response to a signal is shown in FIGS. 19 and 20. In some examples, the apparatus of FIGS. 19-20 may be similar to previously described examples of apparatuses and use similar components with similar naming conventions and numbering. FIG. 19 is a perspective view of an example apparatus 1900 in accordance with the present disclosure. FIG. 20 is a perspective view of a gear reduction assembly that may form part of the apparatus 1900. The apparatus 1900 may include a base plate 402, a closing mechanism 1903 including a movement generator 412, a speed reduction assembly 1913, a spring 1906, a coupling member 1908, a tension member 1920, a cable guide and tensioning device 1975, a spring 1976, a power supply 430, a sensor 1950, hinge assembly 400 with a hinge pin 416 and a hinge pivot cam 426. The apparatus 1900 may also include a control system 431 and a communications system 433. The apparatus 1900 may be mounted or positioned adjacent a door 1901.

In some examples, the movement generator 412 is coupled with the speed reduction assembly 1913 to transfer rotation of an output of the movement generator 412 through the speed reduction assembly 1913. The movement generator 412 and speed reduction assembly 1913 may be coupled to the base plate 402 via the coupling member 1908. In some examples, the coupling member 1908 slidably couples the movement generator 412 and speed reduction assembly 1913 to the base plate 402. The coupling member 1908 may be a slidable sled, with prongs extending from a body of the coupling member 1908 and into corresponding slots formed on the base plate 402, similar to that shown in FIG. 13.

In some examples, the coupling member 1908 is also coupled to a spring 1906 so that the coupling member 1908 is biased.

In some examples, the speed reduction assembly 1913 may be coupled to an output shaft of the movement generator. The speed reduction assembly 1913 may include a first gear member 1955 that may mate or align with an end of output shaft 1957. In some examples, the first gear member 1955 may have a larger diameter and number of teeth than those on the output shaft 1957, so that a speed of the output shaft is faster than a speed of the first gear member 1955. In some examples, the first gear member 1955 may have a smaller diameter and number of teeth than those on the output shaft 1857, so that a speed of the output shaft 1957 is slower than a speed of the first gear member 1955. In some examples, additional gear members are included to further modify or manipulate a rotational speed or torque of an output of the movement generator 412. In some examples, the movement generator 412 of the apparatus 1900 may be a motor with a rotating output shaft.

As shown in FIG. 20, the output shaft 1957 may form a spool assembly to couple the tension member 1920 with the hinge pivot cam 426. As shown in FIG. 19, the apparatus 1900 may also include a cable guide and tensioning device 1975 and a spring 1976, both coupled to the base plate 402. The tension member 1920 may be routed through the table guide and tensioning device 1975, in between the output shaft 1957 and the hinge pivot cam 426. In an unprimed state, the tension member 1920 may have slack in the line. In the primed state, the tension member 1920 may be somewhat taught so that a movement of the movement generator 412 may result in a movement of the door.

In some examples, the sensor 1950 may be a proximity type sensor that may be used to determine a positon of the door, such as if the door is fully closed.

In response to a signal received by the control system 431, the proximity sensor may be engaged to determine the position of the door 1901. For example, if the door is in a closed position, the closing mechanism 1903 may be engaged so any slack in the tension member 1920 may be removed, and the wrapping of the tension member 1920 about the output shaft 1957 may pull the door into a closed position. In use, upon receipt of a signal, the movement generator 412 may engage the speed reduction assembly 1913 to wind or wrap the tension member 1920 around or about the output shaft 1957. The wrapping of the tension member 1920 may control moving the door 1901 from an open position to a closed position. In use, the cable guide and tensioning device 1975 and spring 1976 may be used to help control the location of the tension member 1920 and also manage slack in the tension member 1920 if needed when the movement generator may be reversed but the door 1901 is still closed.

If the movement generator 412 is actively engaged and a user wants to open the door, the user is able to do so, as coupling member 1908 may slide with respect to the base plate 402 via the spring 1906. The spring 1906 may provide a safety mechanism to help protect various components from damage, such as the movement generator 412, the speed reduction assembly 1957, the coupling member 1908, the tension member 1920, the cable guide and tensioning device 1975, spring 1976, hinge pivot cam 426, and other components. In the example of FIG. 19, but without the spring 1906, moving the door from a closed or semi-closed position may damage various components of the closing mechanism. The spring 1906 may be used to further store energy such that if the user opens the door when the movement generator 412 is engaged, energy may be stored in the spring 1906 so that the door continues to close when the user releases the door. In some examples, if the door is difficult to move, energy may be stored in the spring 1906 until there is enough force to start moving the door. In some examples, the spring 1906 may also be used to smooth out the overall operation of the apparatus 1900.

Figure 21:
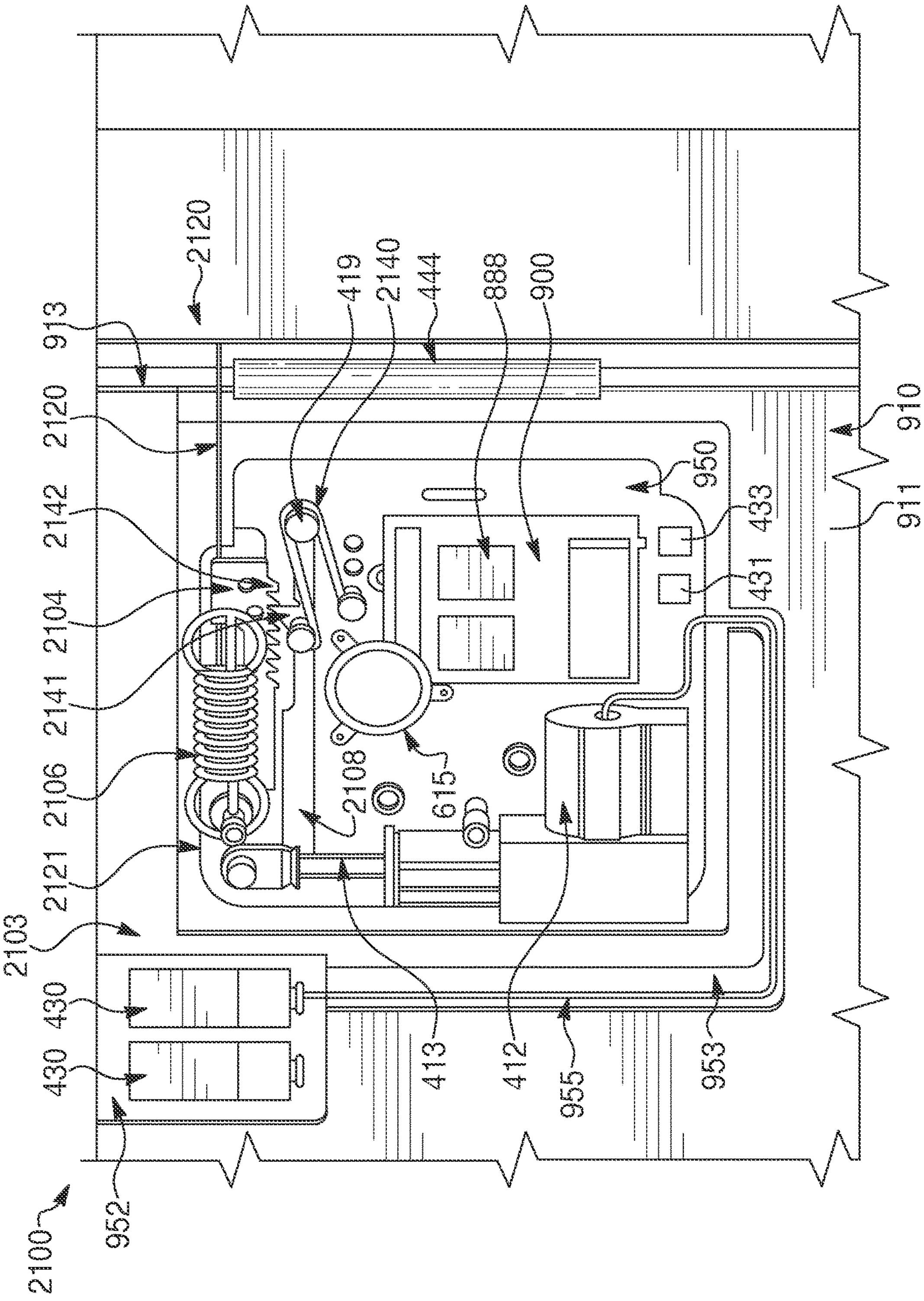
FIG. 21 is a perspective view of an example apparatus in accordance with the present disclosure.
Figure 22:
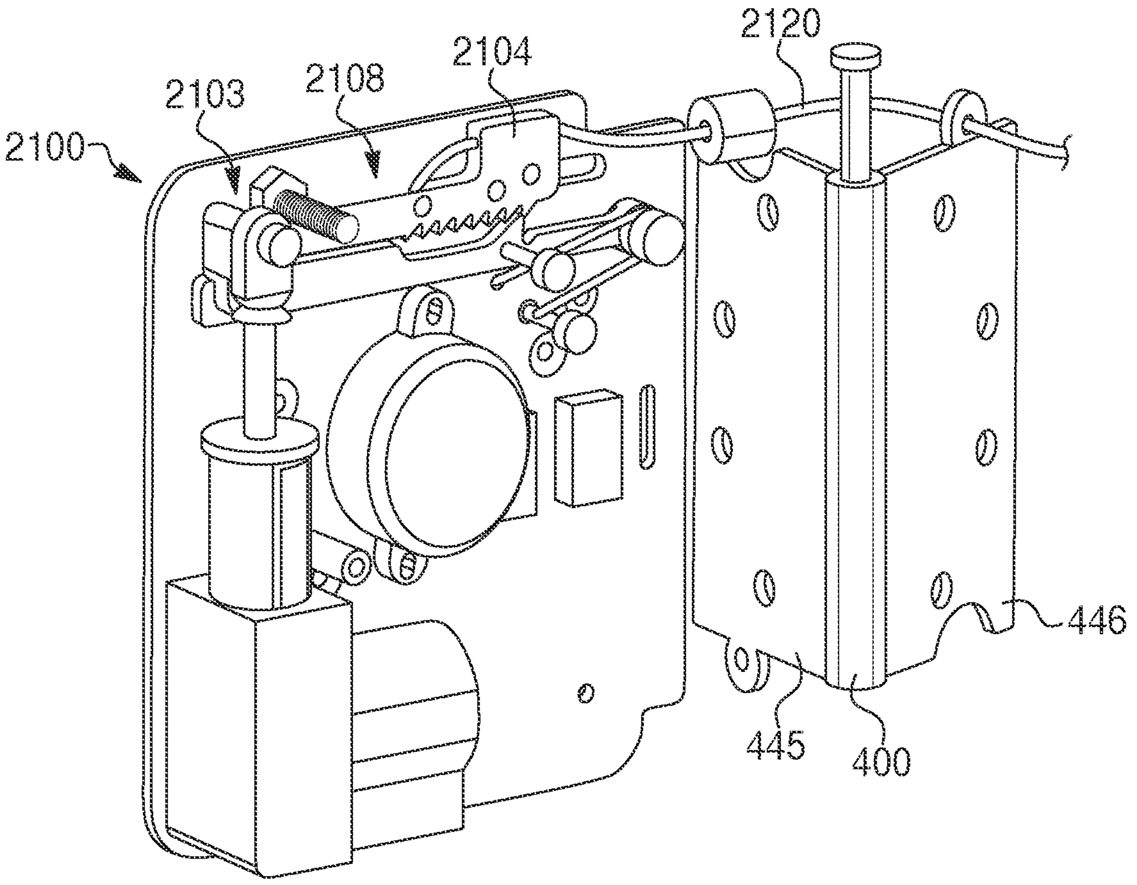
FIG. 22 is an alternate perspective view of the example apparatus of FIG. 20.

Another example apparatus to close a door in response to a signal is shown in FIGS. 21 and 22. In some examples, the apparatus 2100 of FIGS. 21-22 may be similar to previously described examples of apparatuses and use similar components with similar naming conventions and numbering. The apparatus 2100 may be similar to the apparatus 800 of FIGS. 11-13. In some examples, the apparatus 2100 may differ from the apparatus 800 as a hinge pivot cam 426 may not be utilized. FIG. 21 is a perspective view of an example apparatus 2100 in accordance with the present disclosure. FIG. 22 is an alternate perspective view of the example apparatus 2100 of FIG. 21 with various components minimized. FIGS. 21-22 show a closing mechanism 2103, a base plate 402, a closing bar 2104, a spring 2106 (hidden in FIG. 22), a coupling member 2108, a hinge assembly 410, a movement generator 412, a moveable plunger member 413, a pin 419, a tension member 2120, a ratchet assembly 2121, two slide members (not shown), a power supply 430, a spring 2140, a pawl 2141, and a gear 2142. FIG. 21 also shows a control system 431 and a communications system 433.

As shown in FIG. 22, the tension member 2120 may extend through both the first plate 445 and the second plate 446 of the hinge 410. In some examples, the second plate 446 may be coupled or attached to a door frame, a doorjamb, or another stationary object. One end of the tension member 2120 extends through the second plate 446 and may directly couple to a door frame, jamb, or other stationary object. The other end of the tension member 2120 extends through the first plate 445 and couples with the closing member 2108, similar to previously described examples. Similar to other apparatus examples, the pawl 2141 may be releasably retained or positioned between any two of the plurality of teeth 2142. The coupling member 2108 may include the pawl 2141 and may be biased by a spring 2140 about pin 419. The spring 2140 may bias the pawl 2141 towards the teeth 2142. As the door is opened, the closing mechanism 2130 may be positioned in a primed position where energy is stored in the spring 2106.

In use, upon receipt of a signal, the movement generator 412 may move the moveable plunger member 413 to pull down upon the end of the coupling member 2108, and disengage the pawl 2141 from the gear teeth 2142. This may allow the energy stored within the spring 806 to be released and thereby close the existing door. The spring 2106 pulls on closing bar 2108 with a linear force, which in turn pulls on the tension member 2120. The tension that is created in the tension member 2120 from the energy release of the spring 2106 helps move the door from an open position to a closed position In some examples, an alarm and/or detector, such as a fire, smoke, and emergency signal is electrically connected to the base plate 402 and the apparatus 2100 may send an electric signal to the movement generator 412 when fire, smoke, or an emergency is detected.

Examples and details of the hinge related components of the various example apparatuses will now be described.

Figure 9:
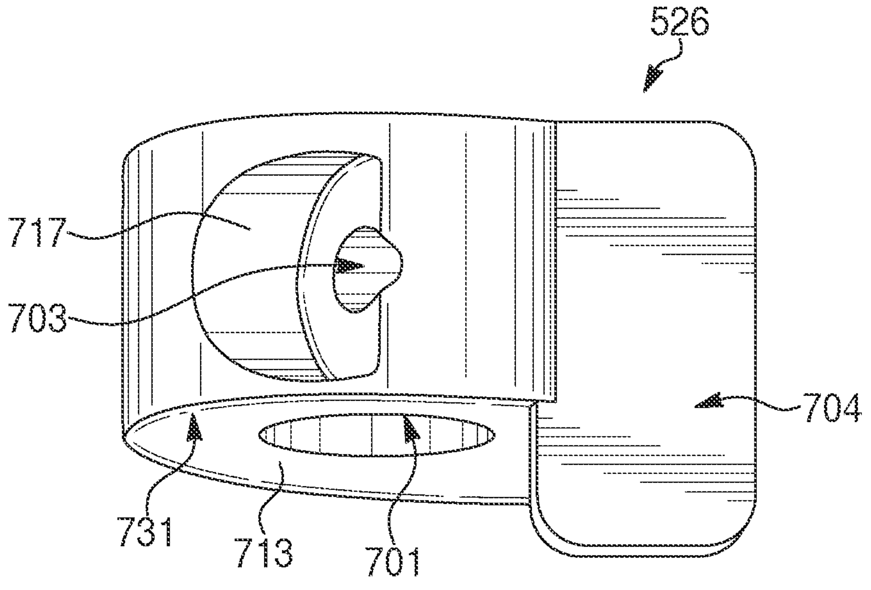
FIG. 9 is a bottom perspective view of a hinge pivot cam.
Figure 10:
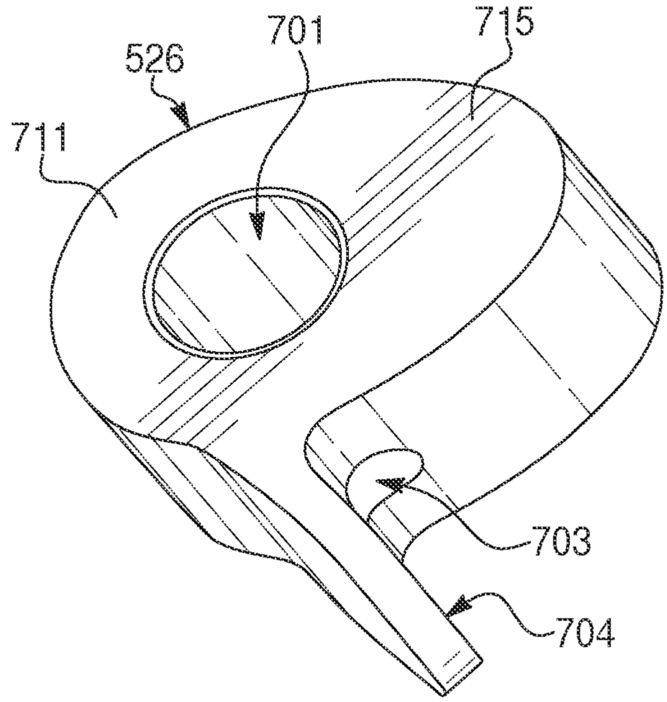
FIG. 10 is a top perspective view of the hinge pivot cam of FIG. 9.

FIGS. 9 and 10 are perspectives view of a hinge pivot cam 526. In some examples, the hinge pivot cam 526 of FIGS. 9 and 10 may be used, at a minimum, in combination with the apparatuses previously described. The hinge pivot cam 526 may include a cam body 731 and a cam lobe 715. In some examples, the cam body 731 and cam lobe 715 have a same general height that extends between an upper face 711 opposite a lower face 713. In some examples, the cam body 731 may be generally circular in shape, while the cam lobe 715 may have an oblong shape. The cam lobe 715 may extend away from the cam body 731, such that the combination of the cam body 731 and cam lobe 715 may form an egg-like shape.

A hinge aperture 701 may extend through the cam body 731 between the upper face 711 and lower face 713. In some examples, the hinge aperture 701 may be relatively sized and shaped to receive a portion of a hinge pin (for example, a hinge pin 416 of FIG. 5). In some examples, a tension member aperture 703 (also shown as an example in FIG. 6) may extend through the cam body 731 along an axis that is generally normal to an axis of the hinge aperture 701. In some examples, a tension member countersink 717 may be formed on one side of the tension member aperture. The tension member countersink 717 may extend into the cam body 731. The tension member countersink 717 may be sized so that a knotted or wide end of a tension member may seat within the countersink 717, helping to couple or secure the hinge pivot cam 526 to the tension member.

In some examples, a tang 704 may extend away from the cam body 731. The tang 704 may have a height that is larger than a height of the cam body 731 and cam lobe 715 and a width similar to that of a hinge plate of the door hinge. In some examples, the tang is formed having a flat surface so that it may be placed against a flat surface of the hinge plate of the hinge.

In use, the lower face 713 of the hinge pivot cam 526 may be positioned adjacent a door hinge. The tang 704 may be positioned adjacent to and contact a hinge plate coupled to a vertical edge of a door. The tang 704 helps to prevent or resist rotation of the hinge pivot cam 526 independent of the door hinge. In use, the tension member extends through the tension member aperture 703 to help secure the tension member to the hinge pivot cam 526.

Figure 14:
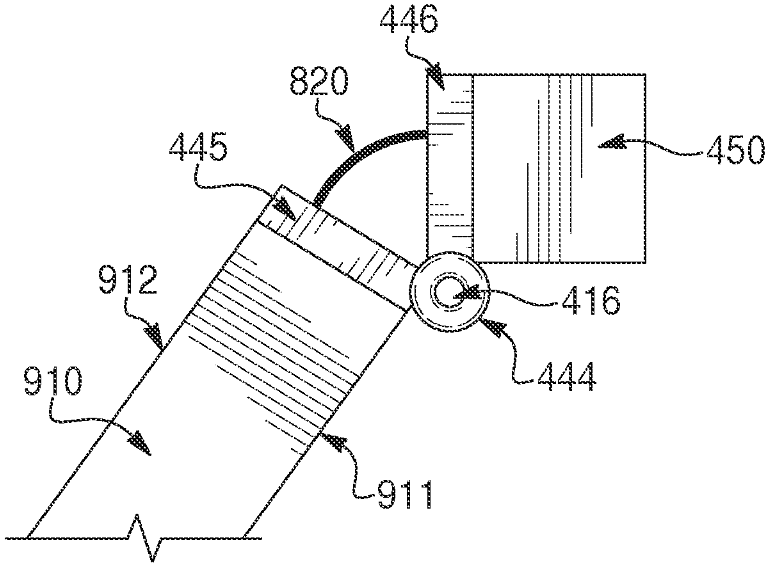
FIG. 14 is a top perspective view of an example apparatus in accordance with the present disclosure in combination with a door member, a door frame, and a hinge.

Another example of a hinge related components is shown in FIG. 14. FIG. 14 is a top perspective view of an example apparatus in accordance with the present disclosure in combination with a door member, a door frame, and a hinge member. FIG. 14 shows a door 910 with a front surface 911, a back or rear surface 912, a hinge 444 with a first plate 445 and a second plate 446, a door frame 450 and a tension member 830. As shown, the tension member 830 extends through the first plate 445 and the second plate 446. In this example, the tension member 830 may be directly coupled to the door 910 and the door frame 450. An example of a hinge pivot cam, which may be mounted on pin 416, is not used in the example FIG. 14, as the tension member 830 is extends directly between the first plate 445 and the second plate 446. In some examples, the apparatus of FIG. 22 uses a similar hinge related component so that the tension member 2120 extends through both the first plate 445 and the second plate 446.

The various examples of apparatuses disclosed herein may include different features described with reference to different figures. Although various examples of the disclosure have been described above with a certain degree of particularity, or with reference to one or more individual examples, those skilled in the art could make numerous alterations to the disclosed examples without departing from the spirit or scope of the claimed disclosure. It is contemplated that the described features and components may be combined in multiple ways with the inclusion and exclusion of different features and components to form a variety of different examples of the apparatus. The disclosure is not intended to be limited to the specific examples included.

With regard to the various examples described herein, variations of the apparatus may include replacing a solenoid with an electric motor and a gear rack to provide a more consistent force and a lower battery consumption. In some examples, the moveable plunger member may be moved by the motor and rack instead of an electromagnet. In some examples, a geared member (straight or rotary) may be used to stretch one of the spring when the door is opened, such that the pawl may control the motion of the gear to ensure the potential energy of the spring is held until a signal is received by the device. In some examples, upon receipt of a signal, the coupling member of closing cam may release the gear and the spring force would act through the gear, tension member, and hinge pivot cam to close the door.

In some examples, the various examples of the described apparatuses may also include haptic, visual, and audible components to notify people that a signal has been received by the apparatus. These components may include a light or LED, such as LED 888 shown in FIG. 11, a speaker, such as speaker 615 shown in FIG. 11, and/or a vibration mechanism to create a noise that may be heard by a user or a movement that might be felt by a user.

Various components and examples of systems that may use an apparatus configured to close a door in response to a signal will now be described. In some examples, the systems may be referred to as smarthome ecosystems. Smarthome ecosystems may include an overall grouping of devices and interactions that may be enabled by smarthome or internet of things (JOT) connected home equipment. In some examples, the apparatuses as described above may be utilized with the systems. In some examples, the apparatus may be used in a smarthome environment. In some examples, the apparatus may be used in a dumb environment (conventional, non-connected, audio only environment) such as with a simple smoke detector that issues an audible alarm.

FIGS. 23-30 are schematics of example systems with an apparatus in accordance with the present disclosure.

Figure 23:
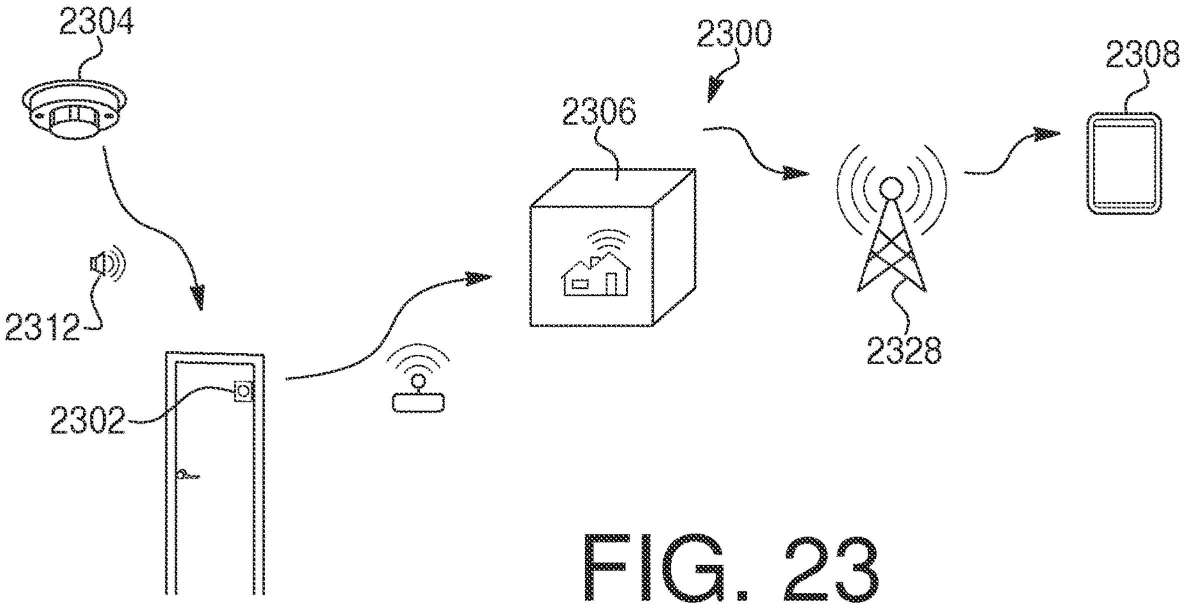
FIG. 23 is a schematic of an example system in accordance with the present disclosure.

The apparatus can be implemented using any of the door closing apparatuses described herein, such as apparatus 102 of FIG. 1, apparatus 400 of FIG. 2, apparatus 600 of FIG. 3, apparatus 500 of FIG. **4*a*, apparatus 200 of FIG. 5, apparatus 800 of FIG. 11, apparatus 1600 of FIG. 16, apparatus 1700 of FIG. 17, apparatus 1800 of FIG. 18, apparatus 1900 of FIG. 19, and apparatus 2100 of FIG. 21. FIG. 23 is a schematic of an example system 2300. The system 2300** may include an apparatus 2302, a detector 2304, a smarthome hub 2306, a mobile device 2308, and an alarm 2312. In some examples, the components of the system 2300 may be connected to one or more of each other.

In some examples, the apparatus 2302 may be an apparatus for receiving a remote signal and coupled to a control system and communication system. In some examples, the control system and communication system form part of the apparatus. In some examples, the apparatus is mounted to, coupled to, or mounted within a door and uses the door hinge to help move the door from an open position to a closed position.

In some examples, the detector 2304 may be a detection device, for example a smoke, fire, gas, motion sensor, or the like.

In some examples, the smarthome hub 2306 may include multiple radios. In some examples, the smarthome hub 2306 may provide an external communications to the internet or cellular network 2328.

In some examples, the mobile device 2308 may be a tablet, mobile phone, laptop, computer, or other device where a wireless connection may be made to the apparatus 2302. In some examples, the mobile device may be a home alarm interface. In some examples, the mobile device 2308 may be a device that is wired with a physical connection to the apparatus 2302. In some examples, a connection may be made between the apparatus 2302 and the mobile device 2308 using a web browser, an app, a blue tooth, or a potentially wired connection using the internet or cellular network 2328.

In some examples, the alarm 2312 may be used to notify a user that the detector 2304 has detected an issue. In some examples, the detector 2304 detects an issue, such as smoke, fire, temperature change, gas presence, etc., and activates an alarm 2315. In some examples, the alarm 2312 may be audible, visual, haptic, or various combinations thereof.

In some examples, the detector 2304 may detect an issue. The detector 2304 may then send a detection signal to the alarm 2312 to issue an alarm. In some examples, the alarm may be an audible alarm similar to the audible alarm issued by a smoke or fire alarm. In some examples, the detector 2304 may send a wireless detection signal to the alarm 2312 to issue an alarm signal. In some examples, the detector 2304 and the alarm 2312 may be combined into a device that may send a signal to the apparatus 2302.

The apparatus 2302 may receive the signal from the alarm 2312. In some examples, the apparatus 2302 may wirelessly receive the signal from the alarm 2312. In some examples, the signal from the alarm 2312 may be transmitted from the alarm 2312 to the apparatus 2302 via a direct line or electrical connection. In response to receiving the signal, the apparatus 2302 may shut the door that the apparatus is coupled to or installed within. The apparatus 2302 may also then send a signal to the smarthome hub 2306 that the door has been shut, the detector 2304 has detected an issue, and/or that the alarm 2312 has issued an alarm.

In some examples, the smarthome hub 2306 may receive the signal from the apparatus 2302. The smarthome hub 2306 may then send a signal to the mobile device 2308. In some examples, the smarthome hub 2306 may send and receive signals from the apparatus 2302 and mobile device 2308. In some examples, the signal from the smarthome hub 2306 may be transmitted through a wireless internet connection, Bluetooth, cellular connection, or other type of connection to the mobile device 2308. In some examples, the user may then engage the mobile device 2308 to select an action, such as reset the alarm, reset the detector, send a communication to a third party, such as an emergency services provider, etc.

Figure 24:
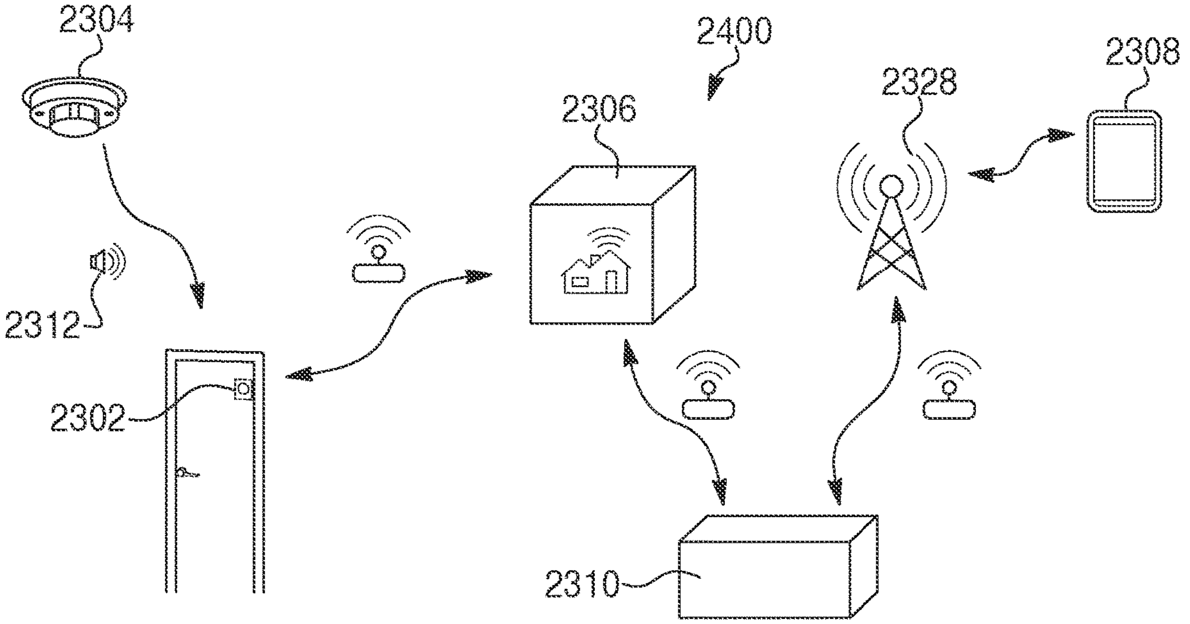
FIG. 24 is a schematic of an example system in accordance with the present disclosure.

FIG. 24 is a schematic of another example system. The system 2400 may be similar to the system 2300 and include an apparatus 2302, a detector 2304, a smarthome hub 2306, a mobile device 2308, a wireless communication manager 2310, and an alarm 2312. In some examples, the components of the system 2400 may be connected to one or more of each other. In some examples, the system 2400 may be similar to the system 2300, except that the system 2400 may include the wireless communication manager 2310.

In some examples, the system 2400 may also be different in that the apparatus 2302 may send and receive signals from the smarthome hub 2306. The smarthome hub 2306 may send and receive signals from the wireless communication manager 2310. The wireless communication manager 2310 may send and receive signals to the internet or cellular network 2328. The mobile device 2308 may send and receive signals to the interact or cellular network 2328.

In some examples, the wireless communications manager 2310 may be a residential or commercial wireless interact router. In some examples, the wireless communications manager 2310 may provide external communication to the internet or cellular network 2328. In some examples, the wireless communications manager 2310 may provide external communication to the internet for the system if the external communication is not provided by an alternate component, such as a smarthome hub 2306.

In some examples, the smarthome hub 2306 may send a signal regarding the status of the apparatus 2302, the detector 2304, or the alarm 2312, to the wireless communications manager 2310. In some examples, the wireless communications manager 2310 may then send a signal to the mobile device 2308 via internet or cellular network 2328.

Figure 25:
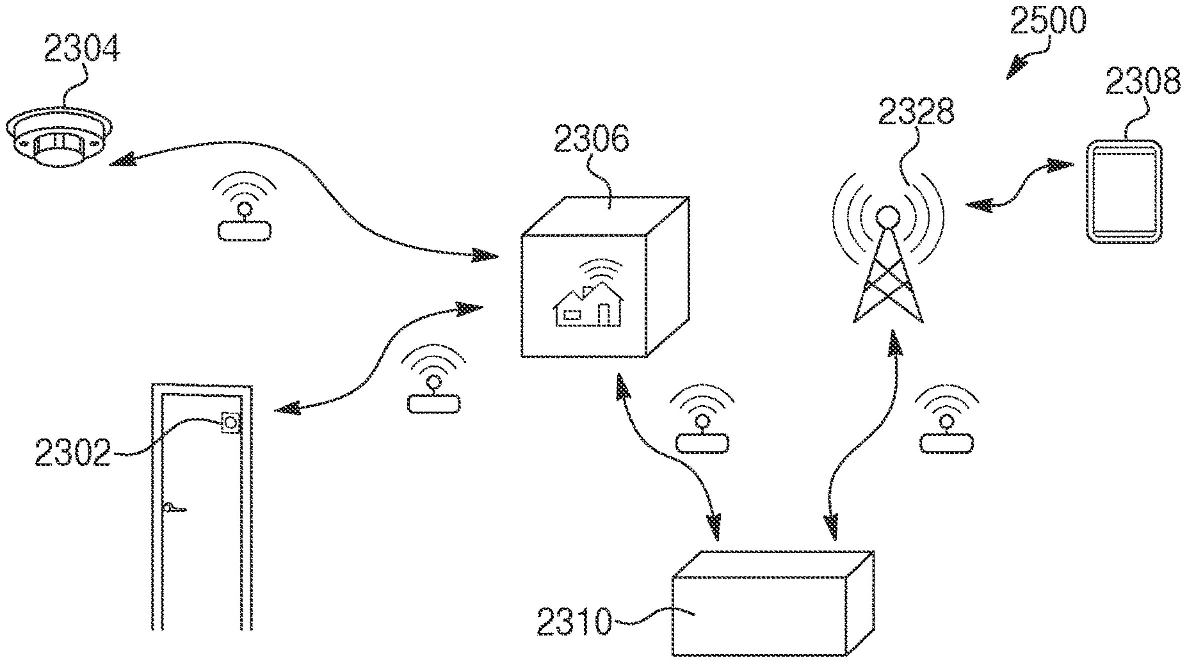
FIG. 25 is a schematic of an example system in accordance with the present disclosure.

FIG. 25 is a schematic of another example system. The system 2500 may be similar to the system 2400 and include an apparatus 2302, a detector 2304, a smarthome hub 2306, a mobile device 2308, and a wireless communication manager 2310. The system 2500 may differ from the system 2400 in that the system 2500 does not have an alarm 2312 separate from the detector 2304. In some examples, the detector 2304 may send and receive a signal to the smarthome hub 2306, which may receive the signal and then send a signal to the apparatus 2302. The smarthome hub 2306 may also then send and receive a signal to the wireless communications manager 2310, which may send and receive a signal to the mobile device 2308 via the internet or cellular network 2328.

Figure 26:
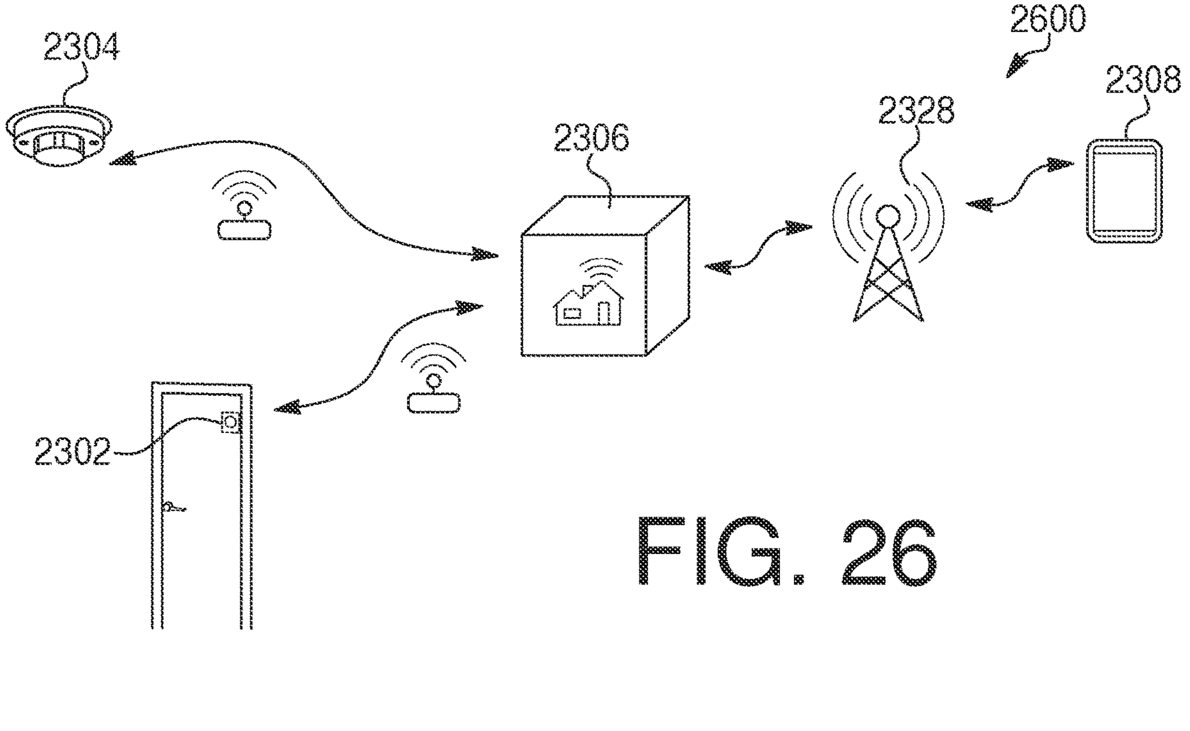
FIG. 26 is a schematic of an example system in accordance with the present disclosure.

FIG. 26 is a schematic of another example system. The system 2600 may be similar to the system 2500 and include an apparatus 2302, a detector 2304, a smarthome hub 2306, and a mobile device 2308. The system 2600 may differ from the system 2500 in that the wireless communication manager 2310 may not be utilized. In the system 2600, the smarthome hub 2306 may send and receive a signal to the mobile device 2308 via the interact or cellular network 2328.

Figure 27:
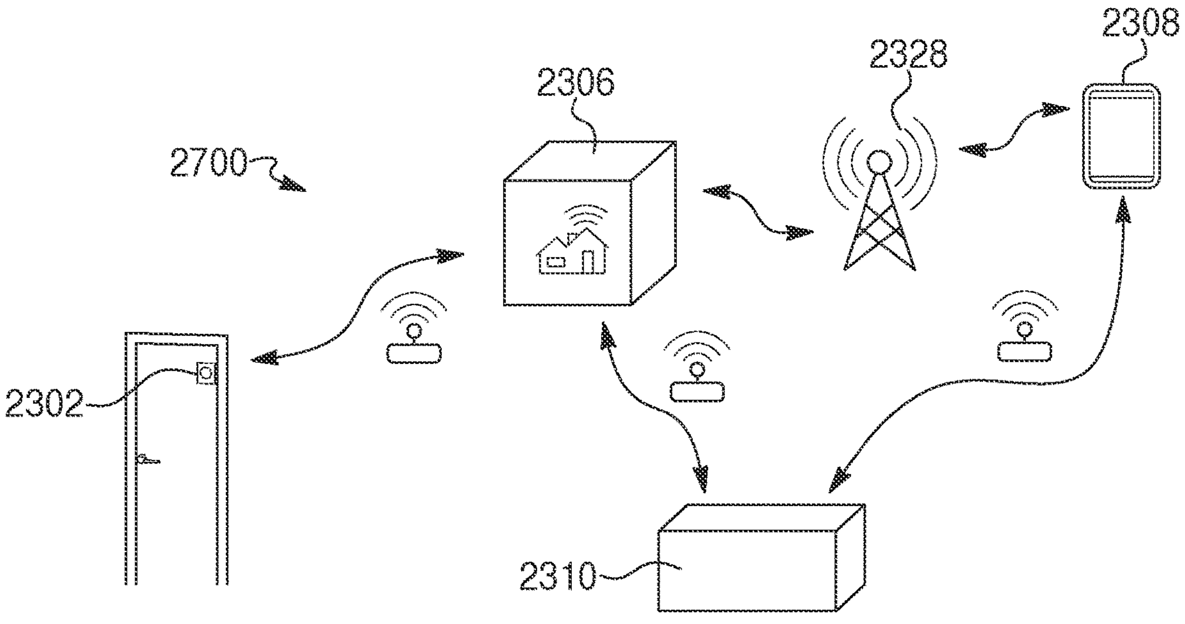
FIG. 27 is a schematic of an example system in accordance with the present disclosure.

FIG. 27 is a schematic of another example system. The system 2700 of FIG. 27 may be similar to the system 2500 of FIG. 25. In some examples, the system 2700 may include an apparatus 2302, a smarthome hub 2306, a mobile device 2308, and a wireless communication manager 2310. The system 2700 may differ from the system 2500 in that a detector 2304 may not be utilized. In the system 2700, the smarthome hub 2306 may send and receive a signal to and from the apparatus 2302.

Figure 28:
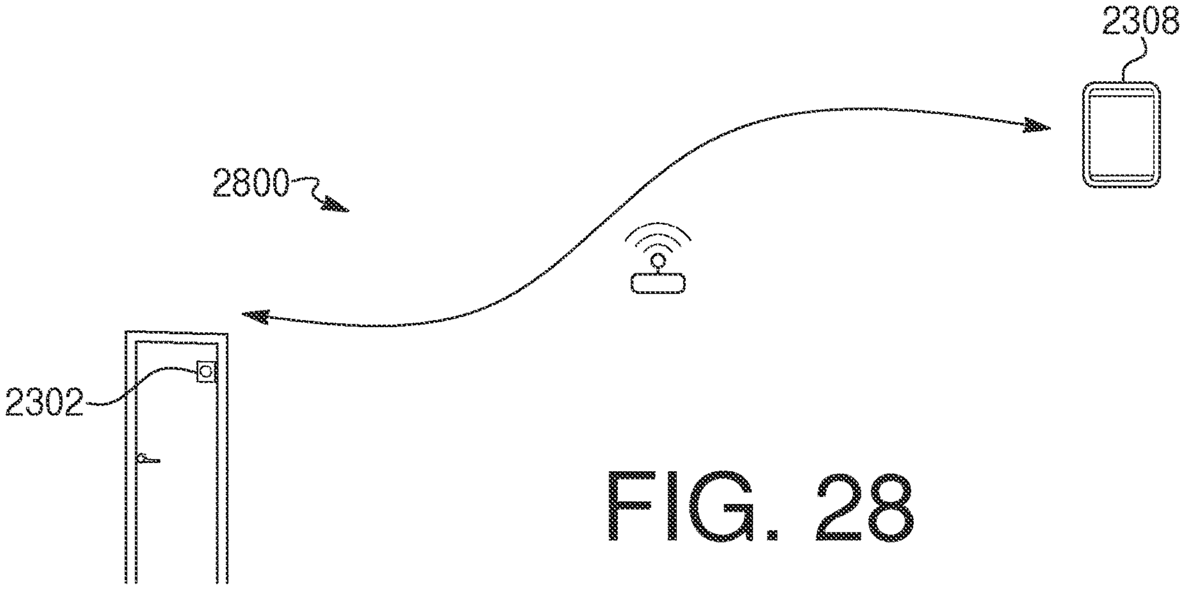
FIG. 28 is a schematic of an example system in accordance with the present disclosure.

FIG. 28 is a schematic of another example system. The system 2800 of FIG. 28 may be similar to previously disclosed examples. The system 2800 may include an apparatus 2302 and a mobile device 2308. In some examples, the apparatus 2302 and mobile device 2308 may be wirelessly coupled so that signals may be sent and received between the two.

Figure 29:
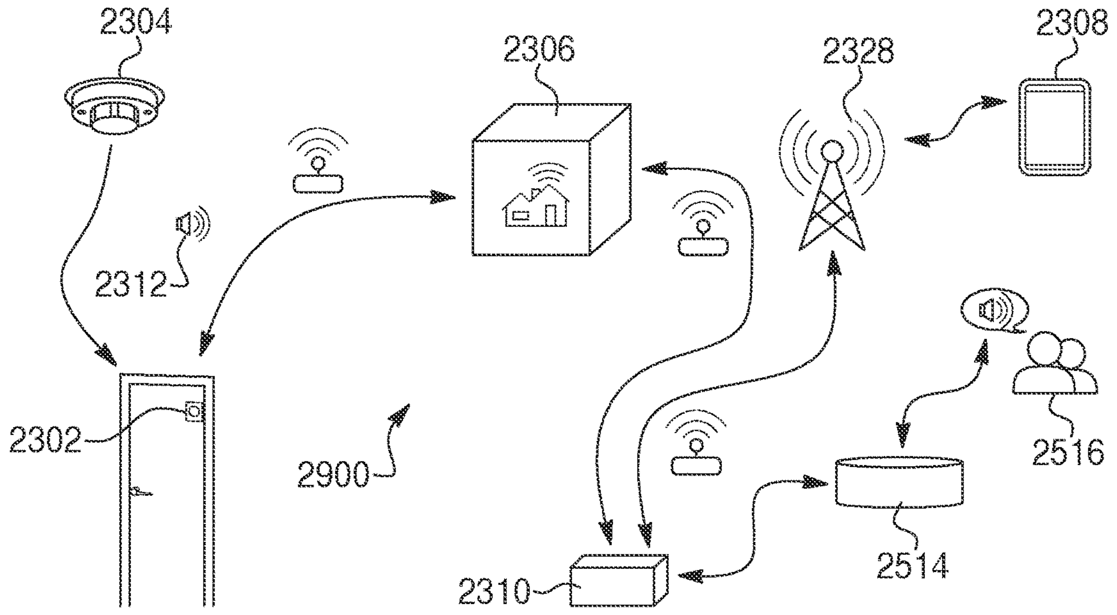
FIG. 29 is a schematic of an example system in accordance with the present disclosure.

FIG. 29 is a schematic of another example system. The system 2900 may be similar to the system 2400 of FIG. 24. The system may include an apparatus 2302, a detector 2304, a smarthome hub 2306, a mobile device 2308, a wireless communication manager 2310, an alarm 2312, and a smart assistant 2314 which may be used to receive and send a signal based upon verbal command 2316.

In some examples, the smart assistant 2314 may be a device that responds to verbal commands from a user. In some examples, the smart assistant 2314 may provide external communication to the internet or cellular network. In some examples, a verbal command 2316 may be issued or provided from a user. In some examples, a verbal command may be issued or provided from an electronic device.

In some examples, the wireless communication manager 2310 may be able to send and receive signals from the smart assistant 2314. In some examples, the smart assistant may be able to send and receive signals to the issuer of a verbal command 2316. In some examples, the issuer of the verbal command 2316 is a human user. In some examples, the issuer of the verbal command may be an electronic device.

Figure 30:
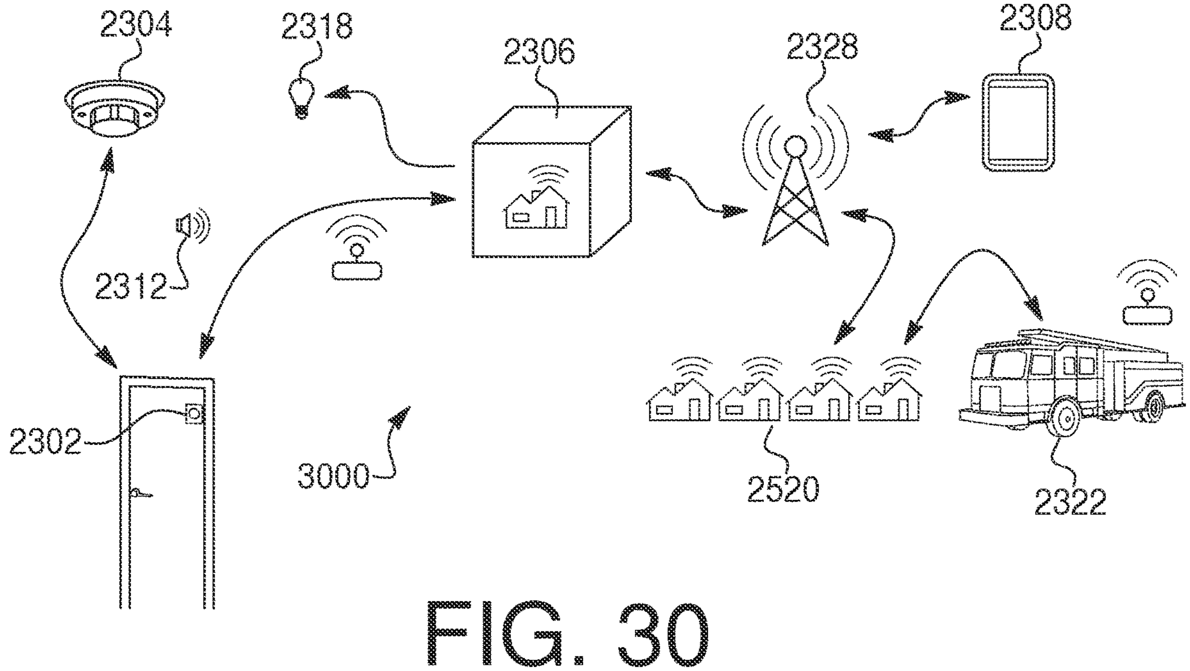
FIG. 30 is a schematic of an example system in accordance with the present disclosure.

FIG. 30 is a schematic of another example system. The system 3000 may be similar to the system 2300 of FIG. 23. The system may include an apparatus 2302, a detector 2304, a smarthome hub 2306, a mobile device 2308, an external indicator 2318, an alarm 2312, a smart city 2320, and skilled personnel 2322.

In some examples, the external indicator 2318 may be a visual component, such as a light being turned on or off. In some examples, the external indicator 2318 may change or alter a structure, such as flipping or moving a sign to provide an indication of a status of the system. In some examples, a smart city 2320 may be created based upon linking multiple individual smart homes or smarthome hubs 2306. In some examples, the skilled personnel 2322 may include but is not limited to emergency responders, firefighters, first responders, police, EMTs, medics, childcare providers, social service providers, elder care providers, offsite family members, etc.

In some examples, the apparatus 2302 may be used to evaluate if a room is occupied and is the apparatus has been activated. This may be useful to skilled personnel 2322 so that they may focus rescue efforts to a maximum benefit and safety.

In some examples, the smarthome hub 2306 may send a signal to the external indicator 2318. In an example, the use of the external indicator 2318 may allow skilled personnel 2322 to understand the status of a room that the apparatus 2302 is installed within. In some examples, if the door the apparatus has been coupled to has been closed, the skilled personnel 2322 may use this information to select the best tactics and area to investigate first, perform search and rescue operations, vent-enter-search operations, etc.

In some examples, the smarthome hub 2306 may be linked to other smarthome hubs to help create a smart city 2320. In some examples, the smart city may be used to send and receive signals from a network of the smarthome hubs 2306 and to skilled personnel 2322. In some examples, skilled personnel 2322 may activate different apparatus 2302 in different or adjacent homes or areas. In some examples, suddenly closing doors may surprise and deter unwanted entrants or intruders as part of a home alarm system, and may be engaged when a known intruder is in the area. In some examples, the skilled personnel 2322 may send and receive signals from the apparatus 2302 if there is an uncontrolled fire or risk of fires expanding to additional homes.

The apparatuses and systems described herein may be combined in various forms and manners to use the apparatus that may close a door in response to receiving a signal.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present devices, systems, and structures described herein, and do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions; order and relative sizes reflected in the drawings attached hereto may vary.

The above specification, examples and data provide a complete description of the structure and use of exemplary embodiments as defined in the claims. Although various embodiments of the claimed disclosure have been described above with a certain degree of particularity, or with reference to one or more individual embodiments, those skilled in the art could make numerous alterations to the disclosed embodiments without departing from the spirit or scope of the claimed disclosure. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosure as defined in the following claims.

What is claimed is:

1. An apparatus comprising:

a base plate configured to be coupled to a front surface of a door, the door configured to be positioned in an open position and a closed position; and a closing mechanism comprising a pivot cam and a closing bar;

the pivot cam configured to be coupled to a hinge of the door using a hinge pin and coupled to the base plate using a tension member;

the closing bar linearly movable and biasingly connected to the base plate and adapted to be releasably held in place via a pawl of a lever member;

the closing mechanism coupled to the base plate and having an unprimed state and a primed state, the closing mechanism configured to be transitioned between the unprimed state and the primed state by a user; wherein in the unprimed state the closing mechanism is decoupled from operation of the door; and in the primed state the closing mechanism is configured to move the door into the closed position responsive to receipt of a signal, and the closing mechanism is configured to allow movement of the door between the open position and the closed position in absence of the signal;

the closing bar including a plurality of gear teeth each adapted to releasably retain the pawl between any two of the plurality of gear teeth.

2. The apparatus of claim 1, wherein the transition between the unprimed state and primed state provides a feedback to the user.

3. The apparatus of claim 1, wherein the closing bar including a plurality of gear teeth each adapted to releasably retain the pawl between any two of the plurality of the gear teeth.

4. The apparatus of claim 1, wherein the closing mechanism comprises a motor or solenoid.

5. The apparatus of claim 1, wherein the closing mechanism is configured to move the door into the closed position at least in part by exerting a stored energy within the closing mechanism onto the tension member.

6. The apparatus of claim 1, wherein the closing mechanism comprises a biasing member pivotally coupled with the lever member and the closing bar.

7. The apparatus of claim 1, wherein the closing mechanism is positioned within the hinge of the door.

8. The apparatus of claim 1, wherein the closing mechanism is configured to receive the signal from at least one of the following: a smoke detector, a temperature detector, a carbon monoxide detector, a home alarm system, a mobile device, or a smarthome hub.

9. The apparatus of claim 1, wherein the closing mechanism comprises a receiver configured to receive the signal and a processor configured to trigger the closing mechanism to move the door into the closed position.

10. A door closing apparatus comprising:

a base plate configured to be coupled to a door, the door configured to be positioned in an open position and a closed position; and a closing mechanism comprising a pivot cam, a closing bar and a cable;

the pivot cam is configured to be coupled to a hinge of the door using a hinge pin and coupled to the base plate using a tension member;

the closing bar is linearly movable and biasingly connected to the base plate and adapted to be releasably held in place via a pawl of a lever member;

the cable is connected at a distal end to the pivot cam and is connected at a proximal end to the closing bar, wherein when the door is pivoted into the open position the cable partially wraps around the pivot cam to move the closing bar;

the closing mechanism coupled to the base plate and having an unprimed state and a primed state, the closing mechanism configured to be transitioned between the unprimed state and the primed state by a user; wherein in the unprimed state the closing mechanism is decoupled from operation of the door; and in the primed state the closing mechanism is configured to move the door into the closed position responsive to receipt of a signal, and the closing mechanism is configured to allow movement of the door between the open position and the closed position in absence of the signal;

the closing bar including a plurality of gear teeth each adapted to releasably retain the pawl between any two of the plurality of the gear teeth.

11. The door closing apparatus of claim 10, wherein the closing mechanism comprises a motor or solenoid.

12. The door closing apparatus of claim 10, further comprising a motor including a plunger member connected to the lever member, wherein the plunger member is adapted to pivot the lever member so as move the pawl out from in between the any two of the plurality of gear teeth of the closing bar.

13. The door closing apparatus of claim 12, wherein the motor is connected to the base plate.

14. The door closing apparatus of claim 10, wherein the tension member is coupled to the frame of the door.

15. The door closing apparatus of claim 10, wherein the closing mechanism is configured to receive the signal from at least one of the following: a smoke detector, a temperature detector, a carbon monoxide detector, a home alarm system, a mobile device, or a smarthome hub.

16. The door closing apparatus of claim 10, wherein the closing mechanism comprises a receiver configured to receive the signal and a processor configured to trigger the closing mechanism to move the door into the closed position.

17. The door closing apparatus of claim 10, wherein the closing mechanism is configured to move the door into the closed position at least in part by exerting a stored energy within the closing mechanism onto the tension member.

18. The door closing apparatus of claim 10, wherein the door closing apparatus is configured to be positioned adjacent the door.

* * * * *